(12) United States Patent
Kumar et al.

(10) Patent No.: US 11,339,335 B1
(45) Date of Patent: May 24, 2022

(54) SOLVENT DEASPHALTING DEAROMATIZATION PROCESS FOR HEAVY OIL UPGRADATION

(71) Applicant: BHARAT PETROLEUM CORPORATION LTD., Maharashtra (IN)

(72) Inventors: Rajeev Kumar, Maharashtra (IN); Ravi Kumar Voolapalli, Maharashtra (IN); Seetaram Chebrolu, Maharashtra (IN); Sreedevi Upadhyayula, New Delhi (IN)

(73) Assignee: BHARAT PETROLEUM CORPORATION LTD., Maharashtra (IN)

( * ) Notice: Subject to any disclaimer, the term of this patent is extended or adjusted under 35 U.S.C. 154(b) by 0 days.

(21) Appl. No.: 17/209,952

(22) Filed: Mar. 23, 2021

(30) Foreign Application Priority Data

Dec. 15, 2020  (IN) .............................. 202021054421

(51) Int. Cl.
  *C10G 21/02* (2006.01)
  *B01J 35/10* (2006.01)
  *C10G 21/20* (2006.01)

(52) U.S. Cl.
  CPC .......... *C10G 21/02* (2013.01); *B01J 35/1014* (2013.01); *B01J 35/1019* (2013.01);
  (Continued)

(58) Field of Classification Search
  CPC .................. C10G 21/02; C10G 21/20; C10G 2300/1077; C10G 2300/202; C10G 2300/206; C10G 2300/302; C10G 2300/304; C10G 2300/308; B01J 35/1014; B01J 35/1019; B01J 35/1023; B01J 35/1038
  See application file for complete search history.

(56) References Cited

U.S. PATENT DOCUMENTS 26,074 A   11/1859  Barrans
26,424 A   12/1859  Ford et al.
(Continued)

*Primary Examiner* — Randy Boyer
*Assistant Examiner* — Juan C Valencia
(74) *Attorney, Agent, or Firm* — D'Ambrosio & Menon, PLLC; Usha Menon

(57) ABSTRACT

An aspect of the present disclosure relates to a process for solvent deasphalting dearomatization, said process including: effecting deasphaltenation of a heavy oil feed by contacting the feed with a paraffinic rich solvent, optionally, in presence of a FCC catalyst to obtain a deasphalted oil rich stream, said paraffinic rich solvent being untreated naphtha; contacting the DAO rich stream with a second solvent to obtain a raffinate stream rich in non-asphaltene and non-aromatic contents and a solvent rich stream; contacting the raffinate stream with water in a first decanter to obtain a first stream rich in aromatic-lean fraction and a second stream rich in the second solvent and water; subjecting the first stream to distillation to recover the paraffinic rich solvent and to obtain deasphalted oil; contacting the solvent rich stream with water in a second decanter to obtain an aromatic rich fraction and a third stream rich in the second solvent and water; and subjecting the second stream and the third stream to distillation to recover the second solvent and water.

10 Claims, 17 Drawing Sheets

(52) U.S. Cl.
CPC ....... *B01J 35/1023* (2013.01); *B01J 35/1038* (2013.01); *C10G 21/20* (2013.01); *C10G 2300/1077* (2013.01); *C10G 2300/202* (2013.01); *C10G 2300/206* (2013.01); *C10G 2300/302* (2013.01); *C10G 2300/304* (2013.01); *C10G 2300/308* (2013.01)

(56) References Cited

U.S. PATENT DOCUMENTS

| | | | |
|---|---|---|---|
| 243,518 A | 6/1881 | Curran | |
| 300,934 A | 6/1884 | Abbott | |
| 4,239,616 A | 12/1980 | Gearhart | |
| 4,342,646 A * | 8/1982 | Sherman | C10G 21/27 208/326 |
| 4,421,639 A | 12/1983 | Lambert et al. | |
| 4,428,824 A | 1/1984 | Choi et al. | |
| 4,454,023 A | 6/1984 | Lutz | |
| 4,572,781 A | 2/1986 | Krasuk et al. | |
| 4,592,832 A * | 6/1986 | Bristow | C10G 53/06 208/309 |
| 4,686,028 A * | 8/1987 | Van Driesen | C10G 21/003 208/309 |
| 4,810,367 A | 3/1989 | Chombart et al. | |
| 5,919,355 A | 7/1999 | Hood | |
| 6,533,925 B1 | 3/2003 | Wallace et al. | |
| 7,381,320 B2 | 6/2008 | Iqbal | |
| 7,597,794 B2 | 10/2009 | Zhao et al. | |
| 7,749,378 B2 | 7/2010 | Iqbal | |
| 2007/0125686 A1 | 6/2007 | Zheng et al. | |
| 2008/0093260 A1 * | 4/2008 | Koseoglu | C10G 25/003 208/45 |
| 2015/0152027 A1 | 6/2015 | Shafi et al. | |

* cited by examiner

SOLVENT DEASPHALTING DEAROMATIZATION PROCESS FOR HEAVY OIL UPGRADATION

CROSS REFERENCE TO RELATED APPLICATION(S)

This application is related to and claims priority to Indian Patent Application No. 202021054421 filed on Dec. 15, 2020, the contents of which are incorporated by reference herein.

TECHNICAL FIELD

The present disclosure pertains to the technical field of heavy oil upgradation. In particular, the present disclosure relates to a solvent deasphalting dearomatization (SD-$A^2$) process for heavy oil upgradation.

BACKGROUND OF THE INVENTION

Background description includes information that may be useful in understanding the present invention. It is not an admission that any of the information provided herein is prior art or relevant to the presently claimed invention, or that any publication specifically or implicitly referenced is prior art.

Forecast of oil production showing continuous increase in heavy or extra-heavy oils. They are available at low cost. In order to increase gross refinery margin, increasing heavy oil diet to refinery feedstock is an opportunity with operational challenges. Asphaltene is the common problem especially when heavy oil fraction increases in the refinery feedstock. High asphaltene content causes flocculation and/or precipitation, instability, and incompatibility which in turn can affect the desalter operation by strong water emulsions with asphaltene, fouling in heat exchangers means excess fuel firing and emissions, and/or coking issues during processing. The severity increases as the feedstock become heavier. In the current practices, the impact of asphaltene are diluted by light oils, checking the blend compatibility of light and heavy oils and accordingly crude mixed are processed. The problem is more complex with increasing number of blending streams in crude mix. If precipitation happens beyond the specified limit, refineries can lose more than the advantage of purchasing the heavy or opportunity crudes. It is noteworthy to mention that maintaining asphaltene compatibility in refining is a temporary solution. Deasphalting (i.e., removal of asphaltene from feedstock) can be the sustenance solution for heavy oils.

Solvent deasphalting (SDA) technology uses light hydrocarbon alkanes as solvent (e.g., propane, butane, pentane, heptane or naphtha) to separate asphaltene-lean phase known as deasphalted oil (DAO) and asphaltene-rich phase known as pitch. SDA processes is the need for refining industry and will continue to be so until at least the end of the 21$^{st}$ century. The most commonly known technologies are: ROSE (Residuum Oil Supercritical Extraction by KBR), LEDA (Low Energy Deasphalting, by Foster Wheeler), Demex technologies by UOP/Foster Wheeler, and Solvahl process by IFP (France)/Axens. The subject has been so important for oil majors, there are several patents on this technology disclosing different process schemes such as U.S. Pat. No. 4,239,616 (1979) discloses deasphalting of heavy oil containing asphaltene up to 18 wt % with paraffins solvent (C3-C9), S/F ratio 10-20; U.S. Pat. No. 4,421,639 (1983) discloses deasphalting using C3 solvent with the objective of an energy efficient continuous recovery of solvent; U.S. Pat. No. 4,428,824 (1984) used C3-C4 solvent, S/F ratio 5-12 and the primary focus was on visbreaking a DAO and subsequently re-blending the recovered asphaltene fraction to produce a product of low viscosity and pour point and requiring less cutter-stock oil as compared to conventional visbreaking processes; U.S. Pat. No. 4,454,023 (1984) discloses integration of visbreaking and SDA using C5 solvent, S/F ratio 12 with the atmospheric residue as feedstock; U.S. Pat. No. 4,572,781 (1986) discloses deasphalting with C5-C12 solvent, S/F ratio 2-12 with the intent of separating substantially dry asphaltenes of high softening point from heavy hydrocarbon material; U.S. Pat. No. 4,810,367 (1989) discloses deasphalting using C3-05 and the primary focus was to develop two stages of precipitation from the feedstock of an asphaltene fraction using light and heavy solvents; U.S. Pat. No. 5,919,355 (1999) discloses a solvent whose critical temperature is Tc to a hydrocarbon feed containing asphaltenes and atmospheric distillate having fractions that boil above about Tc such that said feed is separated into a substantially solvent-free product stream; U.S. Pat. No. 6,533,925 (2003) discloses mixture of solvents containing C3-C7 wherein C6 & C7 is less than 20 wt % and the focus was on heat integration of a solvent deasphalting process with a gasification process; U.S. Pat. No. 7,381,320 (2008) is an extension of ROSE process which discloses the sequence of aromatics solvents following by aliphatic solvents. DAO was subjected to FCCU and asphaltene-rich streams sent to Bitumen, Gasification DCU etc. depending upon configuration; U.S. Pat. No. 7,597,794 (2009) discloses deasphalting using C4-C6, S/F ratio=1.5/1 to 5/1; with super critical solvent recovery process for deep separation of a heavy oil with coupled post-extraction adjustable asphalt residue granulation; U.S. Pat. No. 7,749,378 (2010) & US Pat. US 2007/0125686 (2007) discloses deasphalting of bitumen and sand bitumen respectively as feedstock for upgrading in bitumen; U.S. patent Ser. No. 00/243,518 (2010) discloses deasphalting of Gas Oil from slurry hydrocracking using C4-05; U.S. patent Ser. No. 00/300,934 (2010) discloses an integration of slurry phase hydrocracking and SDA using propane, and solvent recovery under supercritical conditions; US Pat. 0264247 (2013) & 0026074 (2013) discloses heavy oil upgradation using gasoline (C5 to C12) & Naphtha (C5-C12) respectively; and US Pat. 20150152027A1 discloses deasphalting with blend of natural condensate and naphtha as solvent for deasphalting and further proposed an integration of SDA and FCC process for increasing light olefins production, contents whereof are incorporated herein in its entirety by way of reference.

Although lighter solvents C3-05 have proven their performance in deasphalting, the current literature trends of SDA technology indicate that the blend of n-alkanes and heavier paraffins like C5-C12 (including various types of naphtha, gasoline, treated naphtha etc.) can perform as economically viable solvents. This, of course, needs consideration of the types of feedstock, targeted DAO & pitch qualities and the available refinery configuration and the primary objective for selecting the paraffin range of solvent. Among all n-alkane solvents, propane is the most suitable solvent for deasphalting. In literature, the order of preference of solvents reported is—propane>butane>pentane>hexane>heptane. It is known that n-butane and i-butane are good for deasphalting heavy oil, however, there is loss of selectivity when feed becomes lighter, pentane is less selective for metals and CCR removal. Therefore, selection of solvents has always been guided by the feedstock characteristics and the targeted quality of deasphalted oil (DAO); even this holds good for higher carbon range paraffinic solvents. SDA intent is to separate the DAO and pitch, the former being usually fed to fluid catalytic cracking unit (FCCU) or hydrocracking unit (HCU) and the pitch is largely used as bending stock for bitumen, gasification or delayed coker feedstock.

Despite rigorous research in the field of heavy oil upgradation for the past 50 years, there remains a long standing need for an economical and commercially viable process for heavy oil upgradation. The present disclosure provides an improved process for heavy oil upgradation that does not necessarily make use of conventional organic solvents such as propane, butane, pentane, hexane, heptane and treated naphtha.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

OBJECTS

It is an object of the present disclosure to provide an improved process for heavy oil upgradation that is not dependent on utilization of conventional costly solvents such as propane, butane, pentane, hexane, heptane and treated naphtha.

It is an object of the present disclosure to provide an improved process for heavy oil upgradation that is significantly economical and commercially viable.

It is an object of the present disclosure to provide an improved process for heavy oil upgradation that can take up incompatible heavy oil streams as feed.

SUMMARY

The present disclosure pertains to the technical field of heavy oil upgradation. In particular, the present disclosure relates to a solvent deasphalting dearomatization (SD-$A^2$) process for heavy oil upgradation.

The present disclosure is on the premise of surprising discovery by inventors of the present invention that execution of dearomatization process post solvent deasphalting of heavy oil affords utilization of untreated naphtha as a solvent, which is significantly economical solvent as compared to treated naphtha and such other conventional solvents like propane, butane, pentane, hexane and heptane, wherein the untreated naphtha upon undergoing dearomatization results in in-situ (or in-line) generation of treated naphtha that can be recovered and reused again in deasphaltenation of heavy oils. Further, the process of the present disclosure is able to take up incompatible heavy oil streams as feed in stark contrast to conventional processes, affording greater flexibility and huge cost savings. Particularly, the process of the present disclosure affords high flexibility in the process scheme for using different grades of naphtha for producing different grades of deasphalted oil with same feedstock (or feed). It is also suitable to manage feed variations with varying naphtha quality to produce similar quality of deasphalted oil in SD-A2 process scheme. Due to flexibility in the process, the process can be easily integrated with other refinery units wherever heavy oils are produced and need upgradation for asphaltene and aromatics removal for value addition.

Accordingly, an aspect of the present disclosure relates to a process for solvent deasphalting dearomatization for heavy oil upgradation, said process including: (a) effecting deasphaltenation of a heavy oil feed by contacting the feed with a paraffinic rich solvent in presence of a Fluid Catalytic Cracking (FCC) catalyst to obtain a deasphalted oil (DAO) rich stream, said paraffinic rich solvent being untreated naphtha; (b) contacting the deasphalted oil (DAO) rich stream with a second solvent to obtain a raffinate stream rich in non-asphaltene and non-aromatic contents and a solvent rich stream, said second solvent being N-methyl-2-pyrrolidone (NMP), water or combinations thereof; (c) contacting the raffinate stream with water in a first decanter to obtain a first stream rich in aromatic-lean fraction and a second stream rich in the second solvent and water; (d) subjecting the first stream to distillation to recover the paraffinic rich solvent and to obtain deasphalted oil; (e) contacting the solvent rich stream with water in a second decanter to obtain an aromatic rich fraction and a third stream rich in the second solvent and water; and (f) subjecting the second stream and the third stream to distillation to recover the second solvent and water. In an embodiment, the recovered paraffinic rich solvent is reused for effecting deasphaltenation of heavy oil feed. In an embodiment, the recovered second solvent is reused for effecting dearomatization of deasphalted oil rich stream. In an embodiment, the weight ratio of the solvent to the feed (S:F) is between 1:1 to 30:1. In an embodiment, the Fluid Catalytic Cracking (FCC) catalyst is a spent FCC catalyst. In an embodiment, the spent FCC catalyst has BET surface area ranging from 100 $m^2$/g to 200 $m^2$/g, micro pore volume ranging from 0.02 cc/g to 008 cc/g, microporous area ranging from 60 $m^2$/g to 180 $m^2$/g, and matrix surface area ranging from 40 $m^2$/g to 80 $m^2$/g. In an embodiment, the process affords deasphalting dearomatization of incompatible heavy oil streams. In an embodiment, the deasphalted oil (DAO) rich stream is contacted with the second solvent in a weight ratio ranging from 4:1 to 1:4. In an embodiment, the deasphalted oil (DAO) rich stream is contacted with the second solvent in a weight ratio of 1:1. In an embodiment, the step of deasphaltenation of a heavy oil feed is effected in presence of the Fluid Catalytic Cracking (FCC) catalyst at an amount ranging from 0.5 wt. % to about 15 wt. %. In an embodiment, the step of deasphaltenation is effected by contacting the feed with untreated naphtha in presence of the spent Fluid Catalytic Cracking (FCC) catalyst to obtain the deasphalted oil (DAO) rich stream, and wherein the weight ratio of the solvent to the feed (S:F) is 20:1 and the amount of spent Fluid Catalytic Cracking (FCC) catalyst is 5 wt. %.

Another aspect of the present disclosure relates to a process for solvent deasphalting dearomatization for heavy oil upgradation, said process comprising: (a) effecting deasphaltenation of a heavy oil feed by contacting the feed with a paraffinic rich solvent to obtain a deasphalted oil (DAO) rich stream, said paraffinic rich solvent being untreated naphtha; (b) contacting the deasphalted oil (DAO) rich stream with a second solvent to obtain a raffinate stream rich in non-asphaltene and non-aromatic contents and a solvent rich stream, said second solvent being N-methyl-2-pyrrolidone (NMP), water or combinations thereof; (c) contacting the raffinate stream with water in a first decanter to obtain a first stream rich in aromatic-lean fraction and a second stream rich in the second solvent and water; (d) subjecting the first stream to distillation to recover the paraffinic rich solvent and to obtain deasphalted oil; (e) contacting the solvent rich stream with water in a second decanter to obtain an aromatic rich fraction and a third stream rich in the second solvent and water; and (f) subjecting the second stream and the third stream to distillation to recover the second solvent and water. In an embodiment, the recovered paraffinic rich solvent is reused for effecting deasphaltenation of heavy oil feed. In an embodiment, the recovered second solvent is reused for effecting dearomatization of deasphaltenated oil rich stream. In an embodiment, the weight ratio of the solvent to the feed (S:F) is between 1:1 to 10:1. In an embodiment, the process affords deasphalting dearomatization of incompatible heavy oil streams. In an embodiment, the deasphalted oil (DAO) rich stream is contacted with the second solvent in a weight ratio ranging from 4:1 to 1:4, said second solvent being selected from N-methyl-2-pyrrolidone (NMP), water and combinations thereof.

Various objects, features, aspects and advantages of the inventive subject matter will become more apparent from the following detailed description of preferred embodiments.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DETAILED DESCRIPTION

Figure 1:
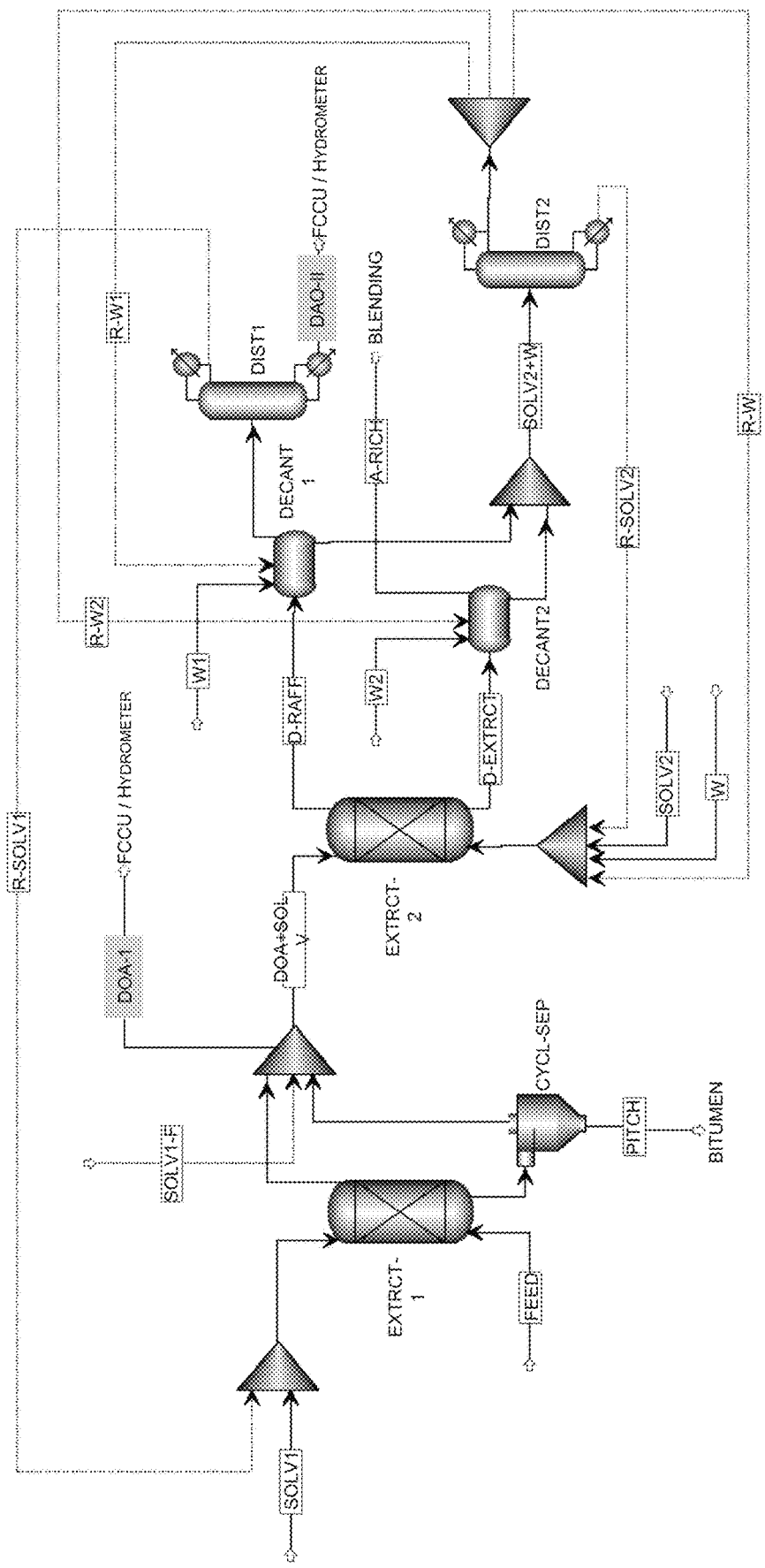
FIG. 1 illustrates an exemplary schematic showing a process for solvent deasphalting dearomatization for heavy oil upgradation, in accordance with embodiments of the present disclosure.

The following is a detailed description of embodiments of the present invention. The embodiments are in such detail as to clearly communicate the invention. However, the amount of detail offered is not intended to limit the anticipated variations of embodiments; on the contrary, the intention is to cover all modifications, equivalents, and alternatives falling within the spirit and scope of the present invention as defined by the appended claims.

The present disclosure pertains to the technical field of heavy oil upgradation. In particular, the present disclosure relates to a solvent deasphalting dearomatization (SD-$A^2$) process for heavy oil upgradation.

Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability.

Unless the context requires otherwise, throughout the specification which follow, the word "comprise" and variations thereof, such as, "comprises" and "comprising" are to be construed in an open, inclusive sense that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

In some embodiments, the numbers expressing quantities of ingredients, properties such as concentration, and so forth, used to describe and claim certain embodiments of the invention are to be understood as being modified in some instances by the term "about." Accordingly, in some embodiments, the numerical parameters set forth in the written description are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable.

The recitation of ranges of values herein is merely intended to serve as a shorthand method of referring individually to each separate value falling within the range. Unless otherwise indicated herein, each individual value is incorporated into the specification as if it were individually recited herein.

The headings and abstract of the invention provided herein are for convenience only and do not interpret the scope or meaning of the embodiments.

All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

Various terms as used herein are shown below. To the extent a term used in a claim is not defined below, it should be given the broadest definition persons in the pertinent art have given that term as reflected in printed publications and issued patents at the time of filing.

The term "heavy oil" as has been used herein throughout the present disclosure, in the context of its upgradation, denotes the meaning of hydrocarbon stream(s), preferably having carbons ranging from C-25 to C-100 and more preferably having carbons ranging from C-40 to C-60 that may advantageously be subjected to the process of the instant disclosure.

The term "untreated naphtha" as has been used herein throughout the present disclosure, denotes straight run naphtha such as Light Naphtha (LN) having boiling range of 52.57° C. to 102.37° C., Heavy Naphtha (HN) having boiling range of 112.97° C. to 136.5° C. and such other grades of naphtha having carbons ranging C5 to C12, which, preferably, is not subjected to dearomatization.

The present disclosure is on the premise of surprising discovery by inventors of the present invention that execution of dearomatization process post solvent deasphalting of heavy oil affords utilization of untreated naphtha as a solvent, which is significantly economical solvent as compared to treated naphtha and such other conventional solvents like propane, butane, pentane, hexane and heptane, wherein the untreated naphtha upon undergoing dearomatization results in in-situ (or in-line) generation of treated naphtha (e.g. raffinate) that can be recovered and reused again in deasphaltenation of heavy oils. Further, the process of the present disclosure is able to take up incompatible heavy oil streams as feed in stark contrast to conventional processes, affording greater flexibility and huge cost savings. Particularly, the process of the present disclosure affords high flexibility in the process scheme for using different grades of naphtha for producing different grades of deasphalted oil with same feedstock (or feed). It is also suitable to manage feed variations with varying naphtha quality to produce similar quality of deasphalted oil in SD-A2 process scheme. Due to flexibility in the process, the process can be easily integrated with other refinery units wherever heavy oils are produced and need upgradation for asphaltene and aromatics removal for value addition.

Accordingly, an aspect of the present disclosure relates to a process for solvent deasphalting dearomatization for heavy oil upgradation, said process including: (a) effecting deasphaltenation of a heavy oil feed by contacting the feed with a paraffinic rich solvent in presence of a Fluid Catalytic Cracking (FCC) catalyst to obtain a deasphalted oil (DAO) rich stream, said paraffinic rich solvent being untreated naphtha; (b) contacting the deasphalted oil (DAO) rich stream with a second solvent to obtain a raffinate stream rich in non-asphaltene and non-aromatic contents and a solvent rich stream, said second solvent being N-methyl-2-pyrrolidone (NMP), water and combinations thereof; (c) contacting the raffinate stream with water in a first decanter to obtain a first stream rich in aromatic-lean fraction and a second stream rich in the second solvent and water; (d) subjecting the first stream to distillation to recover the paraffinic rich solvent and to obtain deasphalted oil; (e) contacting the solvent rich stream with water in a second decanter to obtain an aromatic rich fraction and a third stream rich in the second solvent and water; and (f) subjecting the second stream and the third stream to distillation to recover the second solvent and water. In an embodiment, the recovered paraffinic rich solvent is reused for effecting deasphaltenation of heavy oil feed. In an embodiment, the recovered second solvent is reused for effecting dearomatization of deasphalted oil rich stream. In an embodiment, the weight ratio of the solvent to the feed (S:F) is between 1:1 to 30:1. However, it should be appreciated that any other solvent to the feed (S:F) ratio may be used depending on the heavy oil feed, required deasphatenation and the likes, without detriment to the scope of advantageous process of the instant disclosure. In an embodiment, the Fluid Catalytic Cracking (FCC) catalyst is a spent FCC catalyst. In an embodiment, the spent FCC catalyst has BET surface area ranging from 100 $m^2/g$ to 200 $m^2/g$, micro pore volume ranging from 0.02 cc/g to 0.08 cc/g, microporous area ranging from 60 $m^2/g$ to 180 $m^2/g$, and matrix surface area ranging from 40 $m^2/g$ to 80 $m^2/g$. In an embodiment, the process affords deasphalting dearomatization of incompatible heavy oil streams. In an embodiment, the deasphalted oil (DAO) rich stream is contacted with the second solvent in a weight ratio ranging from 4:1 to 1:4. In an embodiment, the deasphalted oil (DAO) rich stream is contacted with the second solvent in a weight ratio ranging from 2:1 to 1:4. In an embodiment, the deasphalted oil (DAO) rich stream is contacted with the second solvent in a weight ratio of 1:1. In an embodiment, the step of deasphaltenation of a heavy oil feed is effected in presence of the Fluid Catalytic Cracking (FCC) catalyst at an amount ranging from 0.5 wt. % to about 15 wt. %. In an embodiment, the step of deasphaltenation is effected by contacting the feed with untreated naphtha in presence of the spent Fluid Catalytic Cracking (FCC) catalyst to obtain the deasphalted oil (DAO) rich stream, and wherein the weight ratio of the solvent to the feed (S:F) is 20:1 and the amount of spent Fluid Catalytic Cracking (FCC) catalyst is 5 wt. %.

FIG. 1 illustrates an exemplary schematic showing a process for solvent deasphalting dearomatization for heavy oil upgradation, in accordance with an embodiment of the present disclosure. As can be seen from FIG. 1, heavy oils (FEED) is contacted with paraffinic rich solvent (SOLV1) to effect deasphaltenation. The weight ratio of solvent to the feed (S:F) is between 1:1 to 30:1, preferably between 15:1 to 25:1, and most preferably between 17:1 to 23:1. In an embodiment, the solvent to the feed (S/F) weight ratio is 20:1. In an embodiment, heavy oils (FEED) is contacted with paraffinic rich solvent (SOLV1) to effect deasphaltenation in presence of Fluid Catalytic Cracking (FCC) catalyst. Fluid Catalytic Cracking (FCC) catalyst may be a spent (used) catalyst. The spent FCC catalyst acts as adsorbent material and improves the deasphalting efficiency. In an embodiment, the spent FCC catalyst is present in an amount ranging from about 0.5 wt. % to about 15 wt. %, preferably, in an amount ranging from about 3 wt. % to about 7 wt. %. In an embodiment, heavy oils (FEED) is contacted with paraffinic rich solvent (SOLV1) in presence of a spent FCC catalyst to effect deasphaltenation, wherein weight ratio of solvent to the feed (S:F) is 20:1, and wherein the spent FCC catalyst is present in an amount of about 5 wt. %.

Deasphalting (marked as "EXTRCT-1") separates the pitch containing a major portion of asphaltene content of the feed and a portion of solvent (marked as "PITCH"), and a deasphalted oil (DAO) rich stream (DAO-I) containing a major portion of the non-asphaltene content of the heavy oil and a portion of solvent (SOLV1). Solvent (SOVL1) is paraffinic rich and therefore deasphalted oil (DAO-I) can be directly used as co-processing into cracking units (FCCU/Hydrocracker), depending upon the quality of DAO-I and cracking units' tolerance for impurities, even without recovering the solvent or with partial recovery thereof. In an embodiment, the paraffinic rich solvent is untreated naphtha.

The deasphalted oil (DAO) rich stream is then contacted with a second solvent (marked as "SOLV2") to effect dearomatization (marked as "EXTRCT-2") to obtain a raffinate stream (marked as "D-RAFF") rich in non-asphaltene and non-aromatic contents, and a solvent rich stream (marked as "D-EXTRAC"). The deasphalted oil (DAO) rich stream is contacted with the second solvent in a weight ratio ranging from 4:1 to 1:4, preferably in a weight ratio ranging from 2:1 to 1:2. In an embodiment, the deasphalted oil (DAO) rich stream is contacted with the second solvent in a weight ratio of about 1:1. The second solvent (SOLV2) may be N-methyl-2-pyrrolinone (NMP), water, sulfolane, N-formylmorpholine (NFM), tri-ethylene glycol, tetra-ethylene glycol, furfural and combinations thereof, but not limited thereto. In an embodiment, the second solvent is selected from N-methyl-2-pyrrolidone (NMP), water and combinations thereof.

The raffinate stream (D-RAFF) is contacted with water (W1) in a first decanter (DECANT1) to obtain a first stream rich in aromatic-lean fraction and a second stream rich in the second solvent and water. The first stream is subjected to distillation (DIST1) to recover the paraffinic rich solvent (R-SOLV1) and to obtain deasphalted oil (DAO-II). The solvent rich stream (D-EXTRAC) is contacted with water (W2) in a second decanter (DECANT2) to obtain an aromatic rich fraction (A-RICH) and a third stream rich in the second solvent and water. The second stream and the third stream are subjected to distillation (DIST2) to recover the second solvent (R-SOLV2) and water (R-W1, R-W2). As can also be seen from FIG. 2, the recovered solvents (R-SOLV1, R-SOLV2) and recovered water (R-W1, R-W2) can be reused for solvent deasphalting dearomatization for heavy oil upgradation. In an embodiment, the process for solvent deasphalting dearomatization for heavy oil upgradation runs in a continuous mode. In an embodiment, the process for solvent deasphalting dearomatization for heavy oil upgradation runs in a batch mode.

It is noteworthy that supplementing the solvent deasphalting with dearomatization significantly improves the quality and efficiency. Particularly, the process of the present disclosure allows utilization of a straight run untreated naphtha as a solvent in deasphalting, which in the dearomatization process (i.e. the step of contacting the deasphalted oil rich stream with a second solvent to obtain the raffinate stream and the solvent rich stream at EXTRCT-2) undergoes dearomatization along with deasphalted oil (DAO), resulting in in-situ generation of a paraffin-rich stream (raffinate), which can be recovered in down-stream processing as explained hereinabove and can again be used as a solvent for deasphalting. In this sense, the instant process affords high flexibility in terms of using different grades of naphtha for producing different grades of deasphalted oil with same feedstock. The process is also amenable in managing feed variations with varying naphtha quality to produce similar quality of deasphalted oil in the instant process scheme.

Due to flexibility in the process, the process of the present disclosure can be easily integrated with other refinery units (such as FCCU or hydrocracking units) wherever heavy oils are produced and which need upgradation for asphaltene and aromatics removal for achieving value addition. The advantageous process of the instant disclosure is particularly suited for integration with the fluid catalytic cracking units (FCCU) or hydrocracking units. The fluid catalytic cracking units (FCCU) or hydrocracking units may be any conventionally known units, such as downer or riser type FCC units, operation whereof is well known in the art. In an exemplary embodiment, the FCC unit is a downer type FCC unit operating at a temperature ranging from about 550° C. to 650° C. and at a pressure ranging from about 1 to 5 bar using a zeolite type catalyst (e.g. catalyst having 30-80% zeolite, 10-40% binder, and 5-20% filler, which is a mixture of micro-pore and meso-pore catalyst). When advantageous process of the instant disclosure is integrated with the abovementioned downer type FCC unit, it results in improvement in the gasoline yield to the tune of 2-5 wt % and in the propylene yield to the tune of 0.5-2 wt % (with 10% DAO-1 and DAO-2) when compared with utilization of 10% VR. In another exemplary embodiment, the FCC unit is a riser type FCC unit operating at a temperature ranging from about 500° C. to 580° C. and at a pressure ranging from about 1 to 2 bar using a zeolite type catalyst (e.g. catalyst having 30-80% zeolite, 10-40% binder, and 5-20% filler, which is a mixture of micro-pore and meso-pore catalyst). When advantageous process of the instant disclosure is integrated with the abovementioned riser type FCC unit, it results in improvement in gasoline yield to the tune of 2-5 wt % and in the propylene yield to the tune of 0.5-2 wt %, with reduction in the yield of coke to the tune of 1-3 wt % (with 10% DAO-1 and DAO-2) when compared with utilization of 10% VR.

It should be appreciated that usage of Fluid Catalytic Cracking (FCC) catalyst, albeit optional, can afford improvement in the efficiency of solvent deasphalting, plausibly owing to adsorption of asphaltenes on the FCC catalyst, which affords transfer of adsorbed asphaltenes into pitch fraction resulting in higher pitch yields and consequently improved quality of deasphalted oil (DAO). Albeit surprisingly, the inventors of the present disclosure could note that utilization of spent Fluid Catalytic Cracking (FCC) catalyst affords marked improvement in the efficiency of solvent deasphalting. As the spent catalyst is an undesired material at refinery (which typically is disposed-off) and available at low cost, usage of the spent FCC catalyst offers two-fold advantages i.e. meaningful utilization of the spent catalyst and improvement of the deasphalting efficiency. Spent Fluid Catalytic Cracking (FCC) catalyst may be used in the solvent deasphalting in an amount ranging from 0.5 wt. % to about 15 wt. %, preferably, in an amount ranging from about 3 wt % to about 7 wt %. In an embodiment, the spent Fluid Catalytic Cracking (FCC) catalyst is used in the solvent deasphalting in an amount of about 5 wt %.

Another aspect of the present disclosure relates to a process for solvent deasphalting dearomatization for heavy oil upgradation, said process comprising: (a) effecting deasphaltenation of a heavy oil feed by contacting the feed with a paraffinic rich solvent to obtain a deasphalted oil (DAO) rich stream, said paraffinic rich solvent being untreated naphtha; (b) contacting the deasphalted oil (DAO) rich stream with a second solvent to obtain a raffinate stream rich in non-asphaltene and non-aromatic contents and a solvent rich stream, said second solvent being N-methyl-2-pyrrolidone (NMP), water or combinations thereof; (c) contacting the raffinate stream with water in a first decanter to obtain a first stream rich in aromatic-lean fraction and a second stream rich in the second solvent and water; (d) subjecting the first stream to distillation to recover the paraffinic rich solvent and to obtain deasphalted oil; (e) contacting the solvent rich stream with water in a second decanter to obtain an aromatic rich fraction and a third stream rich in the second solvent and water; and (f) subjecting the second stream and the third stream to distillation to recover the second solvent and water. In an embodiment, the recovered paraffinic rich solvent is reused for effecting deasphaltenation of heavy oil feed. In an embodiment, the recovered second solvent is reused for effecting dearomatization of deasphalted oil rich stream. In an embodiment, the weight ratio of the solvent to the feed (S:F) is between 1:1 to 30:1. In an embodiment, the process affords deasphalting dearomatization of incompatible heavy oil streams. In an embodiment, the deasphalted oil (DAO) rich stream is contacted with the second solvent in a weight ratio ranging from 4:1 to 1:4, said second solvent being selected from N-methyl-2-pyrrolidone (NMP), water and combinations thereof.

EXAMPLES

The crude oil samples were sourced from various part of the world. Feedstock (vacuum residue (VR) samples: VR1, VR3, VR4, VR5, VR6, and VR7) was obtained by distillation (ASTM D2892 & D5236) of crude oils. The end point of vacuum distillation is 565+deg C. VR2 feedstock was directly sourced from refinery vacuum tower bottom (565+). Two standard pure paraffinic solvents and three different naphtha (treated/untreated) samples from refinery streams were used in the deasphalting process: n-pentane (C5) (99%, Sigma-Aldrich) and n-heptane (C7) (99%, Sigma-Aldrich), Light Naphtha (LN), Heavy naphtha (HN) and Raffinate Naphtha (RN). RN stream was obtained from aromatics complex unit of Mumbai BPCL Refinery. Raffinate was produced via liquid-liquid-extraction (dearomatization) of a mix of naphtha streams in the refinery. N-Methyl-2-pyrrolidone (NMP) (AR grade, >99%) solvent was purchased for dearomatization study. FCC Spent Catalyst was brought from one of the BPCL group refineries, fluid catalytic cracking unit of Mumbai Refinery.

Seven different feedstock were characterized and incompatibility status of the oils were checked using K Model for their suitability. K Model is the predictive software tool for prediction the incompatibility/inhomogeneity of oil system based on physical parameters of the oil (U.S. Ser. No. 10/365,263B1). The negative K value indicates high incompatibility (inhomogeneity) and positive K value indicates the compatibility (homogeneity) status of the oil system. Herein "Asphaltene incompatibility or inhomogeneity" found to be an important parameters to spot the favorable deasphalting zone. In the process of present disclosure, attempt was made to accommodate maximum possible resources from refinery configuration framework such as solvent, spent catalyst, in-situ regeneration of deasphalting solvent and its integration with FCCU so that it becomes an end to end solution for heavy oil upgradation in its own boundary.

Characterization and Suitability of Feedstock

Feedstock was characterized for API gravity (ASTM D4052), Sulphur (ASTM D2622, D4294, D5453), Kinematic Viscosity (ASTM D445, ASTM D2870 and ASTM D4402), Micro Carbon Residue (ASTM D4530), Pour Point (ASTM D97, D5853, D5950), Saturate content, Aromatic content, Resin content and Asphaltene content (IP143), True Boiling Point (TBP) and PotStill distillation (ASTM D2892 and D5236), Penetration (ASTM D5), softening (ASTM D36) and Compatibility/Stability (K Model) of heavy oils. The characterization results of all seven samples (VR1-VR7) are reported in Table 1.

TABLE 1

Characterization of heavy oils feedstock

| Property Name | Unit | VR-1 | VR-2 | VR-3 | VR-4 | VR-5 | VR-6 | VR-7 |
|---|---|---|---|---|---|---|---|---|
| VR Yield (crude basis) | wt % | 29.33 | 24.58 | 23.99 | 23.94 | 23.72 | 21.15 | 17.52 |
| Density at 15° C. | gm/cc | 1.0398 | 1.0356 | 1.0316 | 1.0303 | 1.0258 | 1.0274 | 1.0211 |
| Sp. Gr.at 60/60° F. | — | 1.0406 | 1.0366 | 1.0324 | 1.0311 | 1.0266 | 1.0282 | 1.0219 |
| API Gravity | — | 4.58 | 5.00 | 5.66 | 5.83 | 6.44 | 6.23 | 7.08 |
| Total Sulphur | wt % | 6.22 | 5.54 | 5.27 | 4.44 | 7.01 | 5.72 | 4.60 |

TABLE 1-continued

Characterization of heavy oils feedstock

| Property Name | Unit | VR-1 | VR-2 | VR-3 | VR-4 | VR-5 | VR-6 | VR-7 |
|---|---|---|---|---|---|---|---|---|
| Pour Point | °C. | 73 | 60 | 68 | 72 | 59 | 63 | 62 |
| Hydrocarbon Types | | | | | | | | |
| Saturates | wt % | 6.51 | 6.14 | 7.20 | 8.11 | 5.77 | 6.50 | 7.97 |
| Aromatics | wt % | 57.77 | 53.34 | 54.50 | 52.04 | 58.17 | 55.07 | 51.66 |
| Resins | wt % | 17.03 | 26.53 | 24.25 | 26.55 | 24.42 | 27.33 | 30.72 |
| Asphaltenes | wt % | 18.70 | 13.99 | 14.04 | 13.30 | 11.64 | 11.10 | 9.65 |
| MCR | wt % | 30.52 | 25.74 | 27.64 | 26.86 | 25.24 | 24.87 | 23.77 |
| KV, 100° C. | cSt | 27011 | 5869 | 5568 | 19028 | 4317 | 6929 | 5394 |
| Penetration | dm | 22.4 | 39 | 44.1 | 33.7 | 74.0 | 63.5 | 91.3 |
| Softening point | °C. | 58.6 | 52 | 52.1 | 54.7 | 47.2 | 48.6 | 45.2 |
| Compatibility/ Stability (K Model) | — | Incompatible (−0.113) | Incompatible (−0.044) | Intermediate (0.000) | Compatible (0.005) | Compatible (0.0390) | Compatible (0.054) | Compatible (0.094) |

VR: Vacuum Residue;
K Model: US10365263B1

As can be seen from Table 1, among all seven heavy oils, Arab Heavy (AH) vacuum residue (VR1) has highest asphaltene content (18.70 wt %) and all other oils (VR2 to VR6) have asphaltene content in the range of 9.65 wt % to 14.04 wt %. Sulphur content of all the VR samples was ranging from 4.44 wt % to 6.22 wt % whereas API value was ranging from 4.58 to 7.08.

Figure 7:
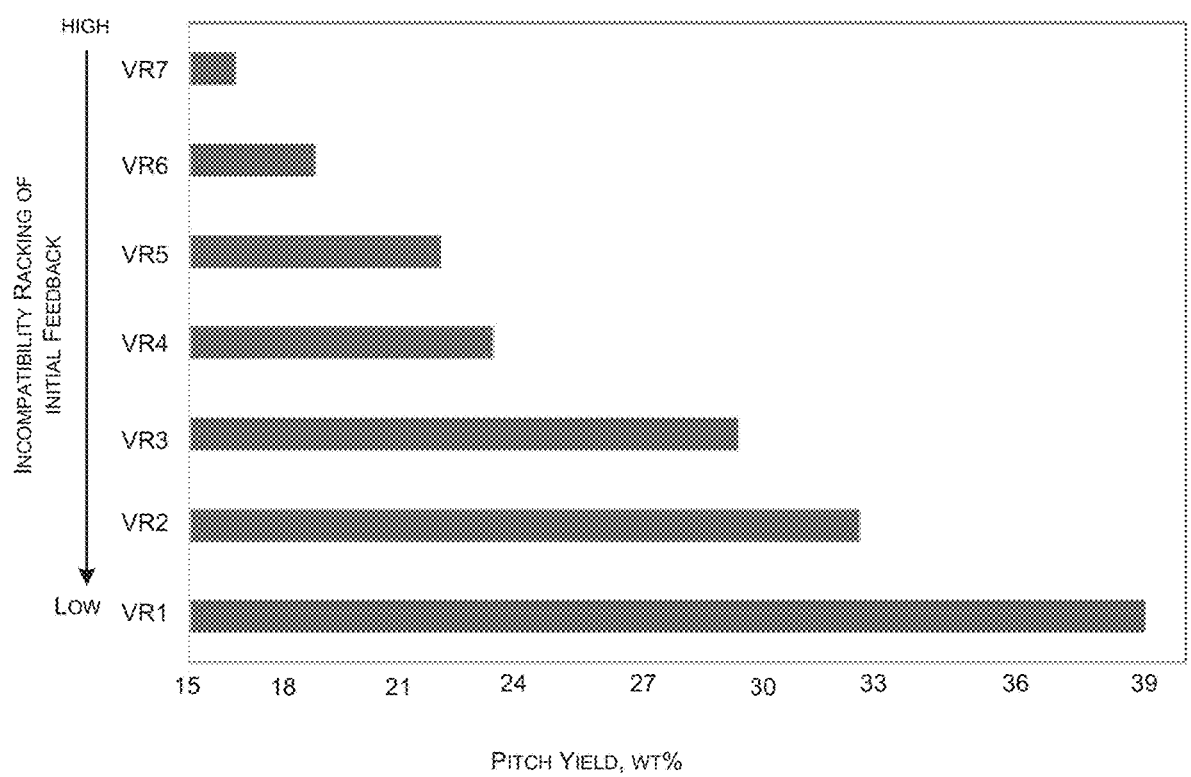
FIG. 7 illustrates an exemplary graph showing suitability of feedstock for solvent deasphalting, in accordance with embodiments of the present disclosure.

The incompatibility parameters of all seven samples were evaluated using K Model and thereafter, subjected to deasphalting. As per K Model, VR1 & VR2 were incompatible (unstable, high asphaltene precipitation propensity), VR3 was intermediate (medium asphaltene precipitation propensity) and VR4 to VR7 were compatible (stable) feedstock. The ranking of feedstock for its incompatibility was given as VR1>VR2>VR3>VR4>VR5>VR6>VR7. The deasphalting results of all these samples showed highest pitch yields for incompatible samples (VR1 & VR2), medium pitch yield for intermediate incompatibility and low pitch yields for compatible blends as depicted in FIG. 7. High pitch yield of VR1 & VR2 means incompatible feedstock produced high quality deasphalted oils (DAO). In-fact, the inventors of the present disclosure could note that feedstock evaluation for incompatibility/un-stability or inhomogeneity should be done for enhancing the solvent deasphalting process, wherein the standard compatibility methods including K Model may be useful for blending the available feedstock for maximizing the incompatibility to enhance the solvent deasphalting for heavy oil upgradation. Considering the process development within refinery configuration framework, feedstock obtained from refinery (VR2) was selected for deasphalting experiments.

Selection and Characterization of Solvent for Deasphaltenation

Five different solvents viz. pentane (C5), heptane (C7) and three different naphtha (untreated/treated) streams from refinery were studied for deasphaltenation. Naphtha (light naphtha (LN), heavy naphtha (HN)) is a low value stream in refinery, and if it meets the deasphalting solvent performance, the overall process will be cost-effective. Physico-chemical characterization of naphtha was carried-out before distillation and detailed hydrocarbon analysis (DHA) was made and correlated with the desalting performance. A raffinate naphtha (RN) which is a dearomatized stream obtained from one of the units of refinery (Aromatics Complex) was used for the study.

Figure 2:
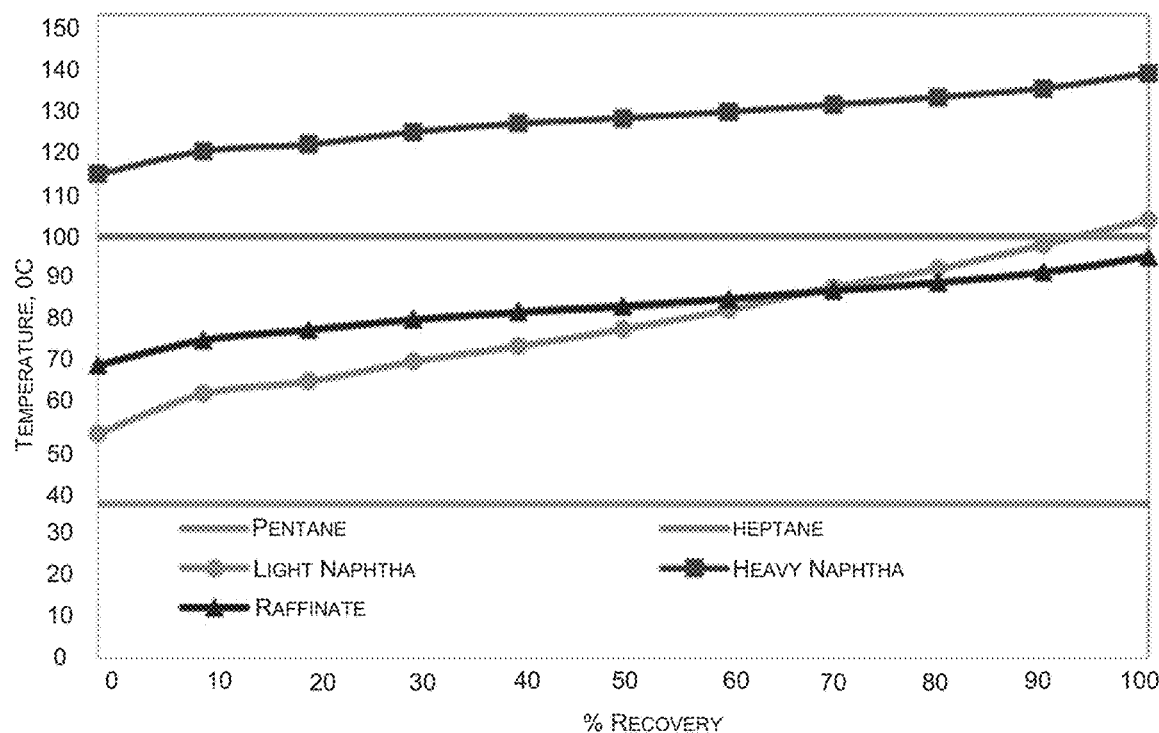
FIG. 2 illustrates an exemplary ASTM D86 distillation profile of solvents for deasphalting process, in accordance with embodiments of the present disclosure.

Physico-chemical characterization of deasphalting solvents was carried-out for distillation using ASTM D86 method and detailed hydrocarbon analysis (DHA) using ASTM D6729 method was done. DHA covers the determination of individual hydrocarbon components with boiling ranges up to 225° C. These characterizations were carried-out for refinery solvents (LN, HN, RN)) which are a mixture of hydrocarbons in the boiling range of 52.57-136.7° C., however, the other two solvents (n-C5 & n-C7) were pure alkyl components. Distillation profile data (ASTM D86) is shown in FIG. 2, and DHA characterization data is reported in Table 2.

TABLE 2

Hydrocarbon analysis of deasphalting solvents

| DHA (%) | C5 | C7 | LN | HN | RN |
|---|---|---|---|---|---|
| Saturates (S), wt % | | | | | |
| Cyclic (S) | — | — | 11.38 | 36.91 | 12.54 |
| Iso (S) | — | — | 17.07 | 38.48 | 42.25 |
| Normal (S) | 100.00 | 100.00 | 6.00 | 2.54 | 34.45 |
| Un-saturates (US), wt % | | | | | |
| Cyclic (US) | — | — | — | — | 0.86 |
| N_Iso (US) | — | — | 65.28 | 15.70 | 9.90 |
| Aromatics (US) | — | — | 0.27 | 6.37 | 0.01 |
| Total | 100.00 | 100.00 | 100.00 | 100.00 | 100.00 |
| n-alkanes (C5 to C7), wt % | | | | | |
| n-05 | 100 | — | 0.18 | 1.11 | 13.42 |
| n-C6 | — | — | 0.61 | 0.12 | 14.12 |
| n-C7 | — | 100 | 0.29 | 0.04 | 0.04 |

The distillation range of naphtha streams are viz. Light Naphtha (boiling range: 52.57-102.37° C.), Heavy naphtha (boiling range: 112.97-136.5° C.) and Raffinate, (boiling range: 68.50-93.70° C.). Refinery light naphtha (LN) sample was observed to be heavier than n-C4 and lighter than n-C8 whereas heavy naphtha (HN) was heavier among all the solvents. Raffinate naphtha (RN) is a treated naphtha obtained from aromatics complex unit of refinery from which aromatics components were extracted using sulfolane solvent and it has boiling range 68.50-93.70 deg C. The boiling range of RN lower than n-C9 and higher than n-C4. The solvent chemical characteristics play a significant role on deasphalting. Detailed hydrocarbon analysis (DHA) results reported in Table 2 revealed that RN has highest normal saturates and iso-saturates with lowest aromatics content. HN has low normal saturates content among all three naphtha samples chosen. Hydrocarbon characteristics of all three naphtha samples are different with respect to boiling range & hydrocarbons constituents (Table 2) therefore, solvent performances were expected to be different for deasphalting for yields and quality.

Solvent Deasphalting Dearomatization & DAO Characterization

Solvent deasphalting experiments were carried-out using five different solvents at different solvent to feed (S/F) ratios weight basis (4, 8, 12, 15 & 20) at ambient conditions for screening the suitable solvent within refinery framework. With the selected solvent, fluid catalytic cracking unit spent FCC catalyst (Sp. Cat.) was added (5 wt %) at different S/F ratio at ambient condition to study the adsorption of asphaltene molecules for improving the deasphalting efficiency.

The experiments began with pre-heating of the VR feedstock near to its pour point temperature for making it homogeneous to flow and then it was added into Sp. Cat was mixed with the solvent and stirred at 500 rpm for 2 hr at 25° C. The settling time kept for the mixture was about 4 hr. After that the mixture was decanted on filter cone made up of 2.5 μm Whatman filter paper so that pitch stay at the surface and DAO was collected in the flask. The solvent was separated from the DAO by evaporation and loss was estimated. The DAO and Pitch weight were calculated to analyze the solvent deasphalting yields with and without spent catalyst. The DAO obtained from all experiments were characterized for saturates, aromatics, resins and asphaltenes using IATROSCAN MK-6 TLC/FID thin layer chromatograph instrument (M/s LSI Medicine Japan) and sulfur contents using ASTMD1298-12, respectively. The DAO obtained from the deasphalting experiments is hereinafter be called DAO-I.

The feed for dearomatization experiment was DAO-I. In the present study, DAO-I was obtained from deasphalting using selected solvent along with Sp. Cat. The most suitable solvent was selected through modeling & simulation studies of various potential solvents. Dearomatization experiment was carried out by mixing DAO-I and selected solvent at 1:1 S/F ratio (weight basis) admixed with 5 wt % water and stirred at 500 rpm at near to the boiling point temperature of 150-200° C. for 2 hr. The settling time kept for the mixture for phase separation (upper phase: raffinate, bottom phase: extract) was about 4 hr. The solvent were separated from raffinate phase by evaporation and loss was calculated. The raffinate obtained in dearomatization step is hereinafter called DAO-II. The DAO-II was further characterized for saturates, aromatics, resins and asphaltene using IATROSCAN MK-6 TLC/FID thin layer chromatograph instrument (M/s LSI Medicine Japan).

Spot Test

This test is based on visual decision and easy to figure out incompatibility of crude oils and blends. As per ASTM D4740, one drop of the sample is placed on a filter paper. Then the filter paper is kept in oven for drying for one hour at 100° C. After that the observed spot is required to be classified according to the following types mentioned in Table 3 below. According to this method, if a spot is classified into category 3 or higher categories, then the crude oil is marked as incompatible.

TABLE 3

| Spot test characteristics | |
|---|---|
| Categories | Spot characteristics |
| 1 | Homogeneous spot without inner ring |
| 2 | Faint or poorly defined inner ring |
| 3 | Well-defined thin inner ring, only slightly darker than the background |
| 4 | Well-defined inner ring, thicker than the ring in reference spot No. 3 and somewhat darker than the background |
| 5 | Very dark solid or nearly solid area in the center. Central area is darker than the background |

Characterization of FCC Spent Catalyst

Spent FCC catalyst (Sp. Cat.) and fresh FCC catalysts were obtained from fluid catalytic cracking unit (FCCU) of BPCL Mumbai Refinery and the same was characterized and compared as reported in Table 4.

TABLE 4

| Characterization of FCC spent catalyst | | |
|---|---|---|
| Properties | Spent Catalyst | Fresh Catalyst |
| BET SA, m$^2$/g | 196 | 310 |
| Micro pore volume, cc/g | 0.05 | — |
| Micro porous area, m$^2$/g | 132 | 223 |
| Matrix surface area, m$^2$/g | 64 | 87 |
| Unit Cell Å | 24.25 | 24.25 |

Fluid Catalytic Cracking of VGO+DAO for Product Yields

Cracking experiments were conducted in an ACE-R+ pilot unit loaded with 4-9 g of spent FCC catalyst. The feed (VGO+DAO preheated to 40-130° C.) was delivered at 1.125 g/min by a constant-drive syringe pump and was injected approximately 1 cm above the catalyst bed at 520° C. The procedure and characterization of cracked liquid and gaseous products were as follows: Cycle time for one experiment on the ACE-R+ unit is approximately 2 hrs. Each cycle has 15 sub-steps which include feeding of catalyst, priming and withdrawal of liquid feed using a calibrated syringe pump, temperature stability check for reaction, feed injection, catalyst and liquid stripping for removing trapped hydrocarbons, gas measurement, in-situ regeneration and coke measurement. Gaseous products from the reaction are collected in a gas collection vessel and analyzed using an on-line Refinery Gas Analyzer (RGA). Liquid products are condensed, collected in a vial and weighed. They are analyzed off-line using a Simulated Distillation (SimDist) GC. SimDist report presents a summary of the % weight vs boiling point for the liquid product. Results included conversion, yields of dry gas (H2-C2), liquefied petroleum gas (LPG, i.e., C3 and C4), gasoline (IBP-186° C.), light cycle oil (LCO, 186-343° C.), heavy cycle oil (HCO, 343-370°

C.), (CLO, 370+) and coke. Conversion was calculated as the summation of dry gas, LPG, gasoline and coke.

Modeling for Selection of Dearomatization Solvent

Figure 3A:
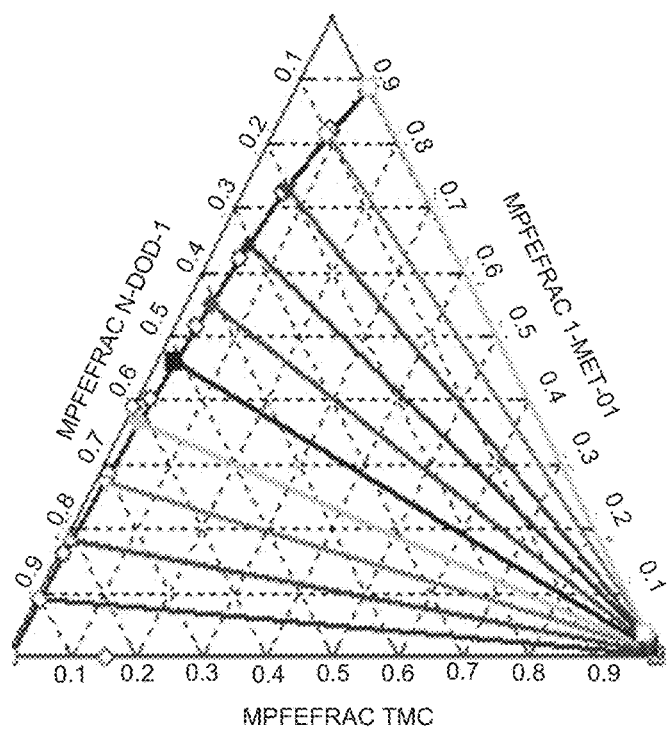
FIGS. 3A-3C illustrate exemplary Ternary phase diagrams of Sulfolane (TMS), NMP (N-MET-01) & Tetra-Ethylene Glycol (TETRA-01), in accordance with embodiments of the present disclosure.
Figure 3B:
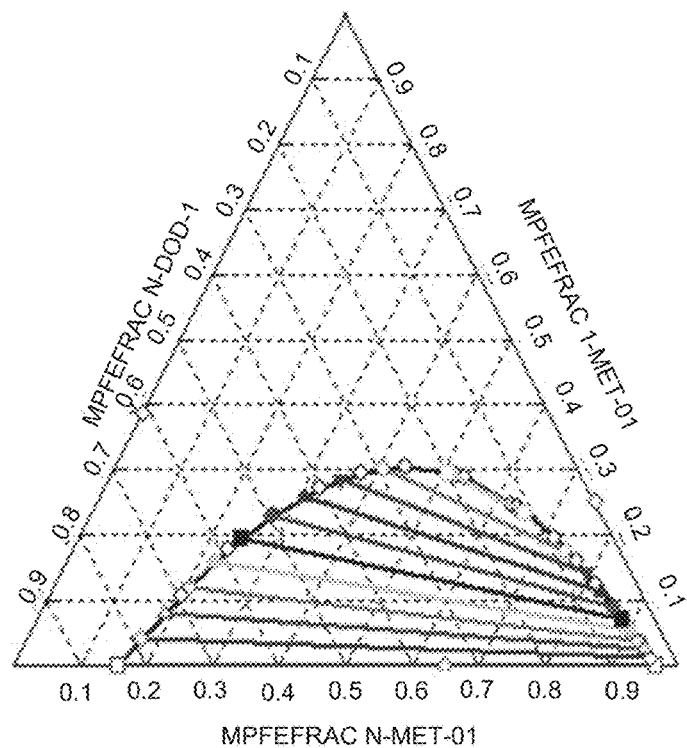
Figure 3C:
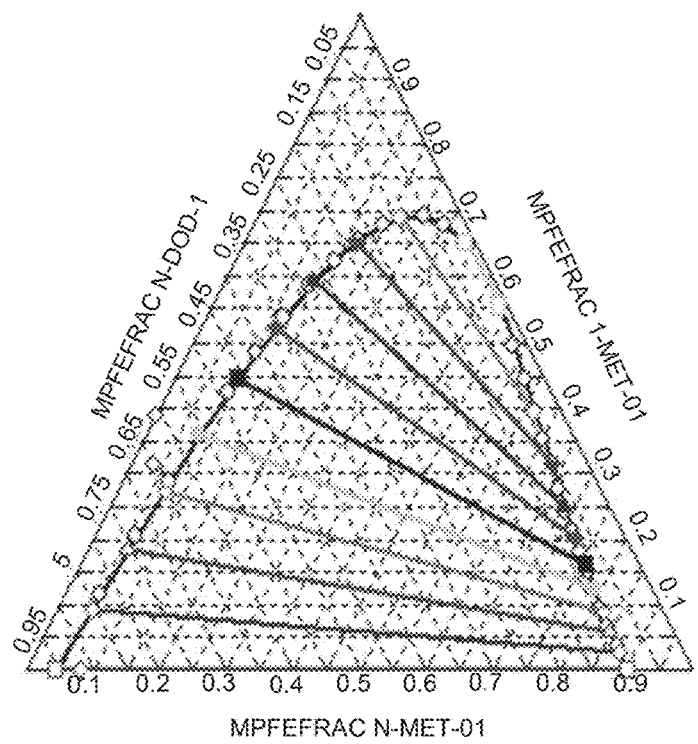
Figure 4A:
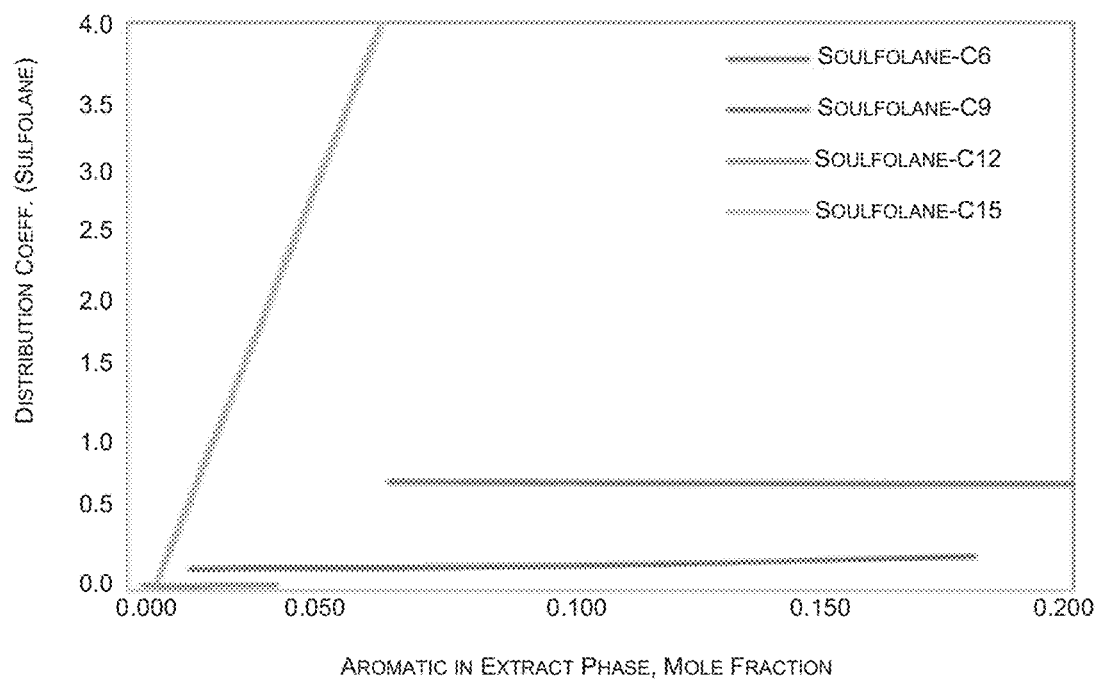
FIGS. 4A-4F illustrate exemplary graphs showing Distribution coefficients of Sulfolane (TMS), N-methyl-2-pyrrolinone (NMP), tetra-ethylene glycol (TETRA), tri-ethylene glycol (TRI), Furfural and N-formylmorpholine (NFM), in accordance with embodiments of the present disclosure.
Figure 4B:
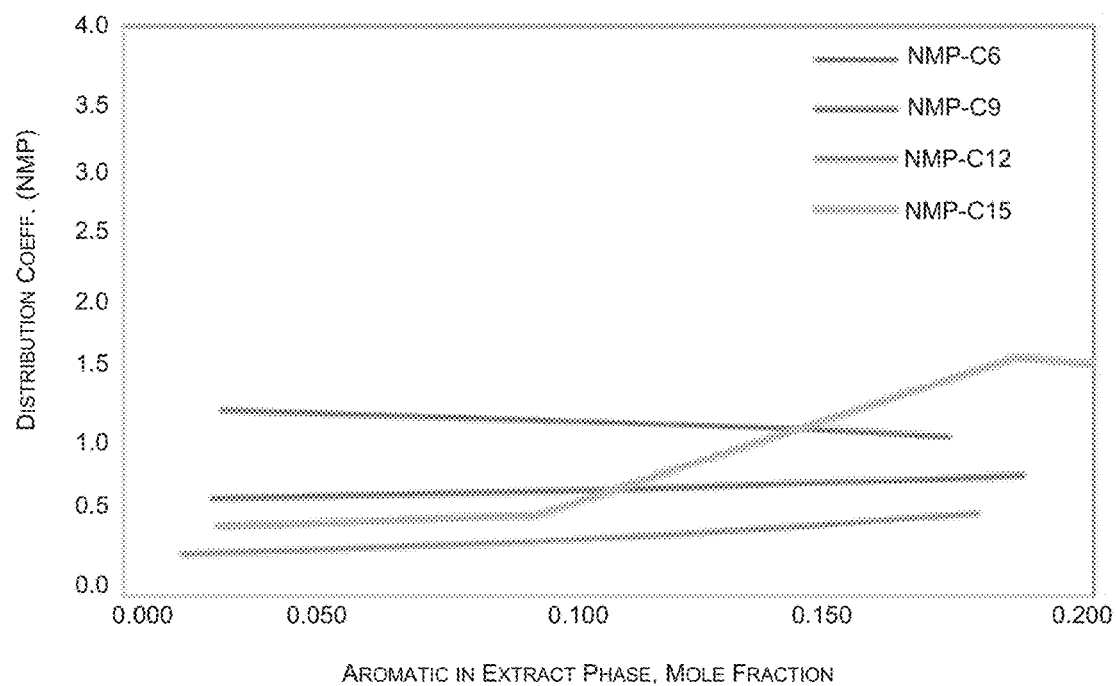
Figure 4C:
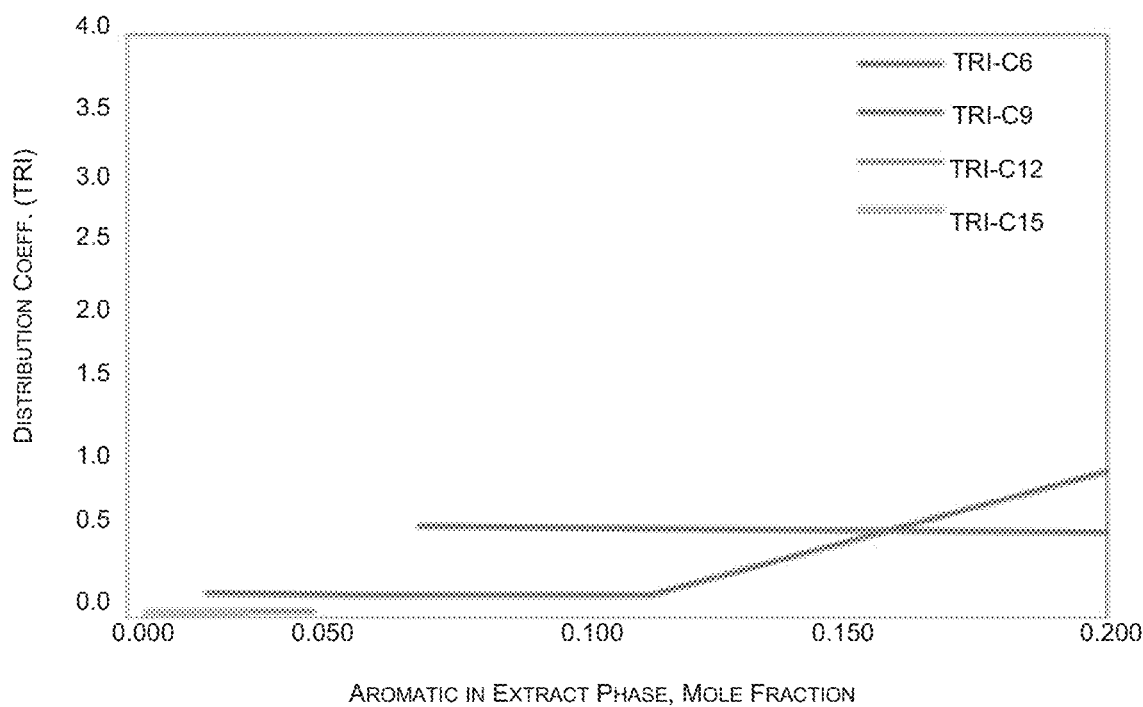
Figure 4D:
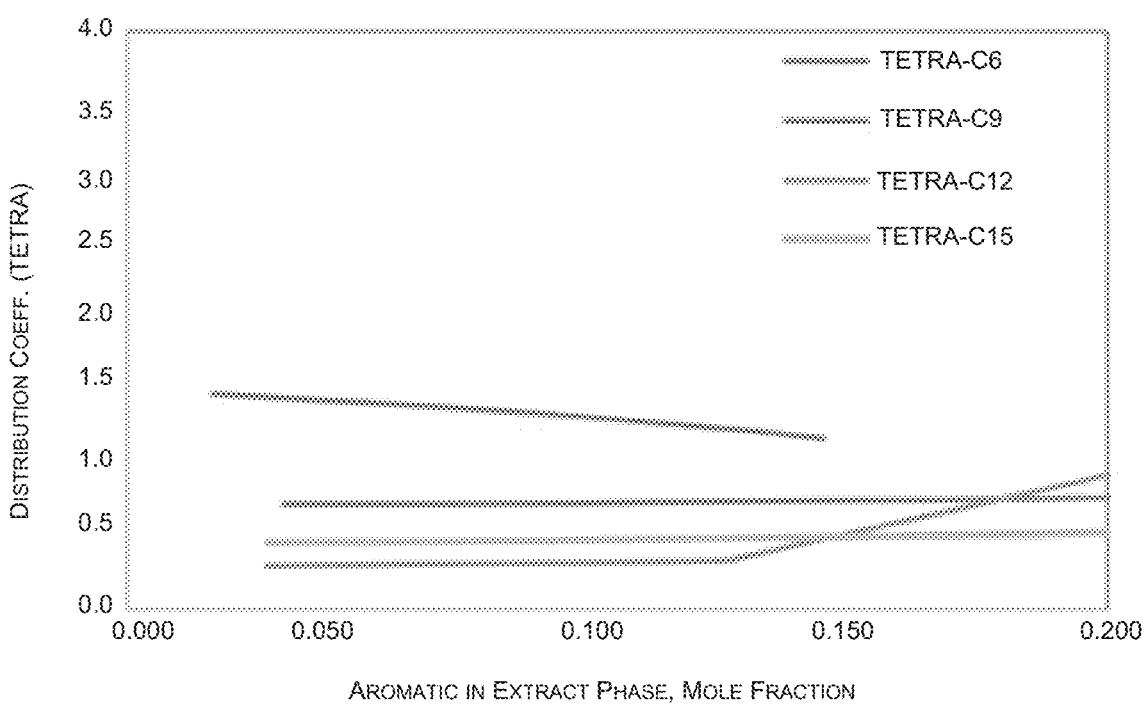
Figure 4E:
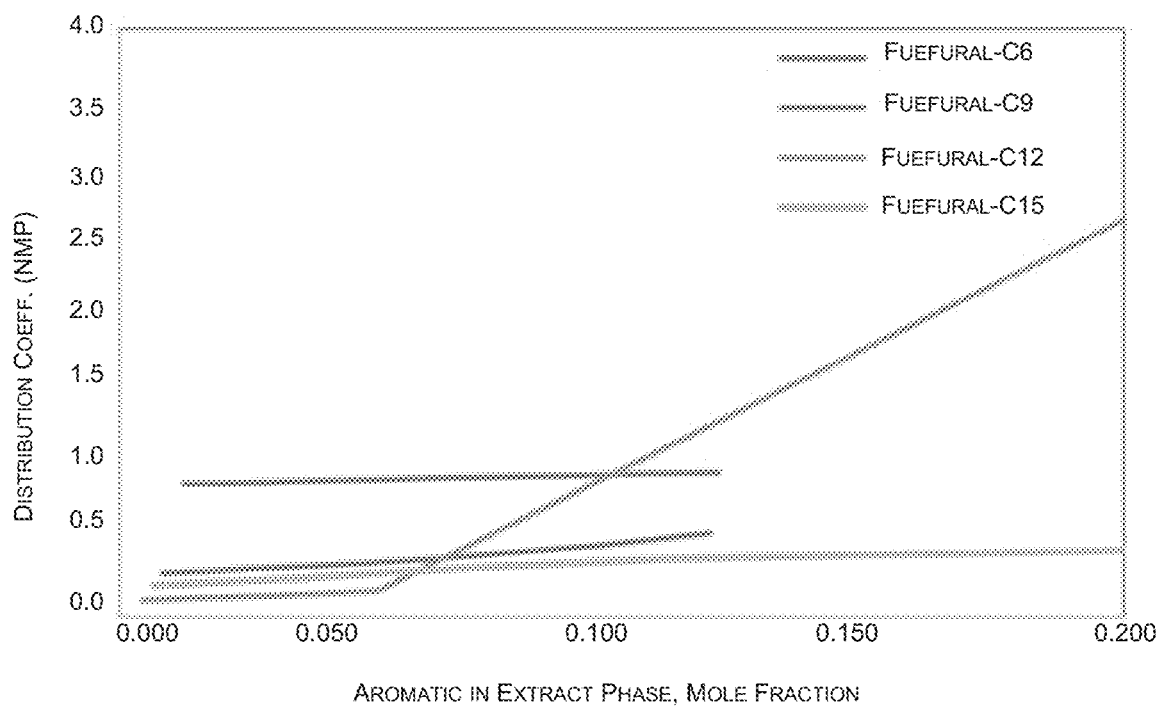
Figure 4F:
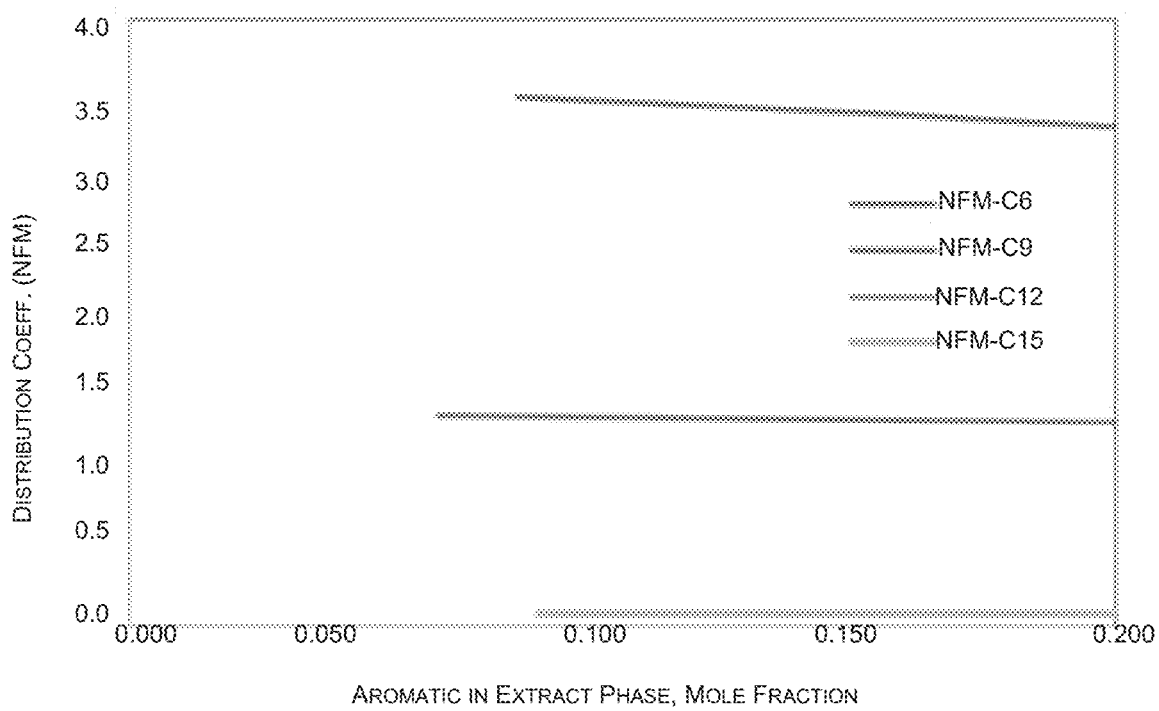
Figure 5A:
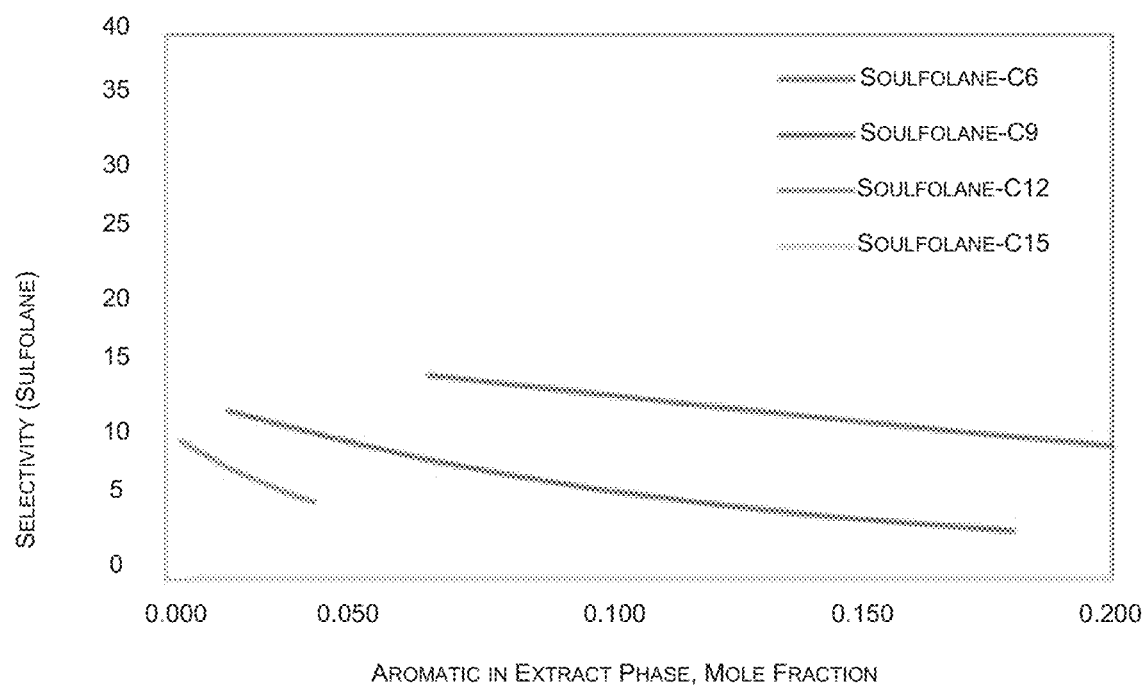
FIGS. 5A-5F illustrate exemplary graphs showing selectivity of TMS, NMP, TETRA, TRI, Furfural & NFM, in accordance with embodiments of the present disclosure.
Figure 5B:
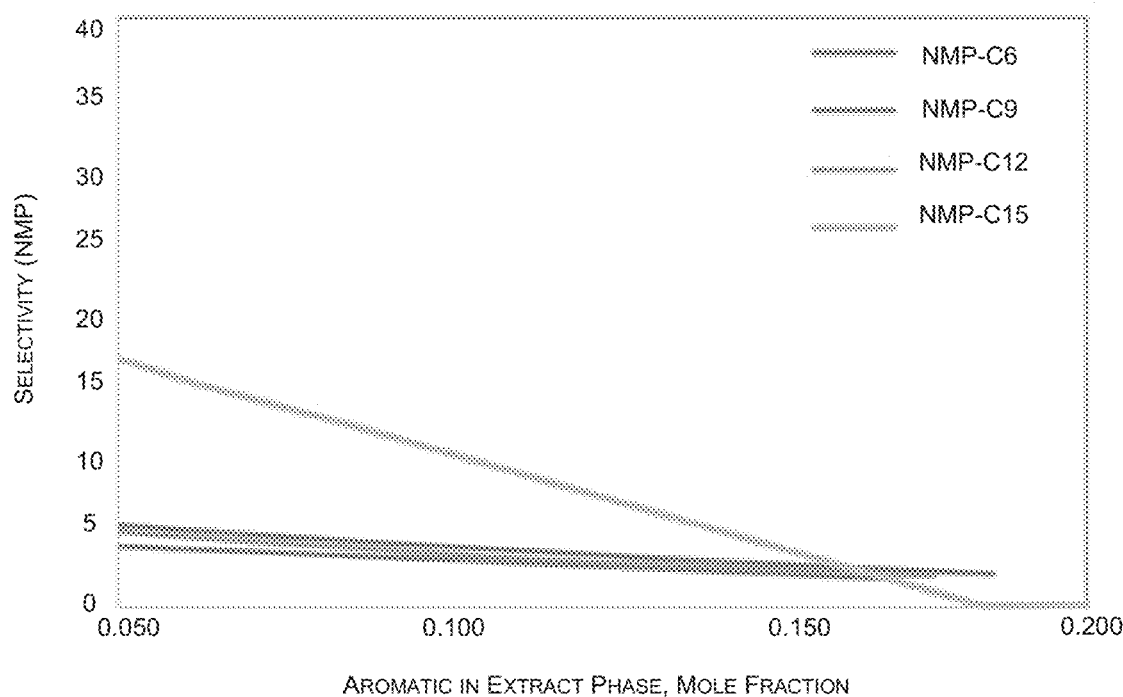
Figure 5C:
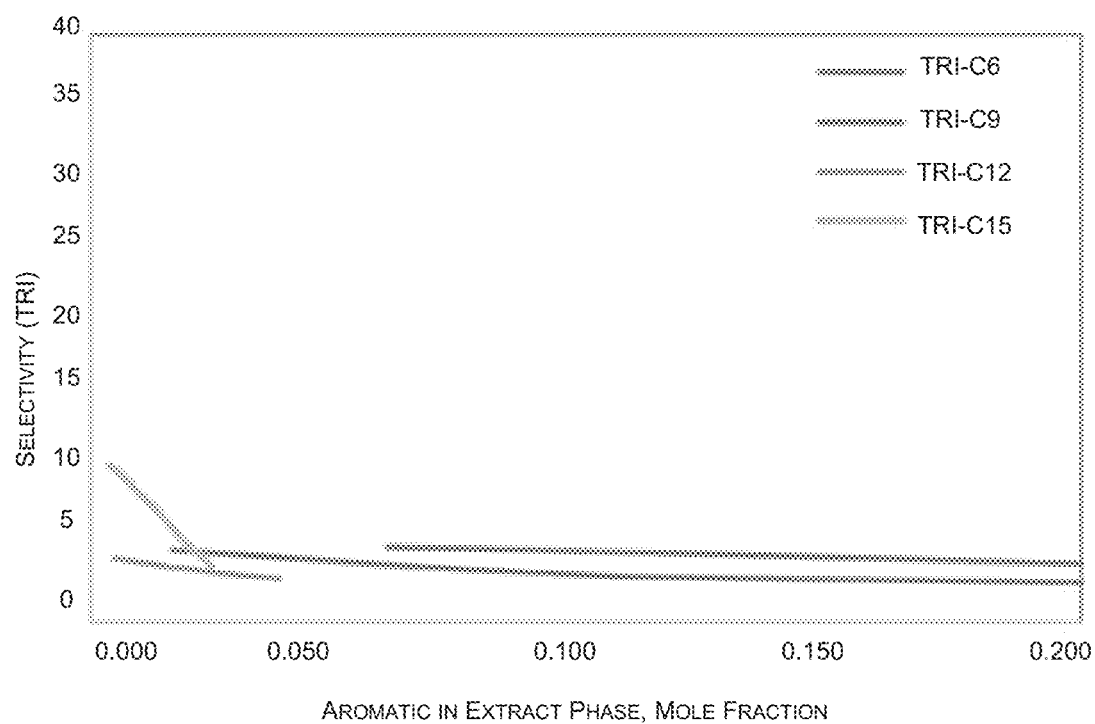
Figure 5D:
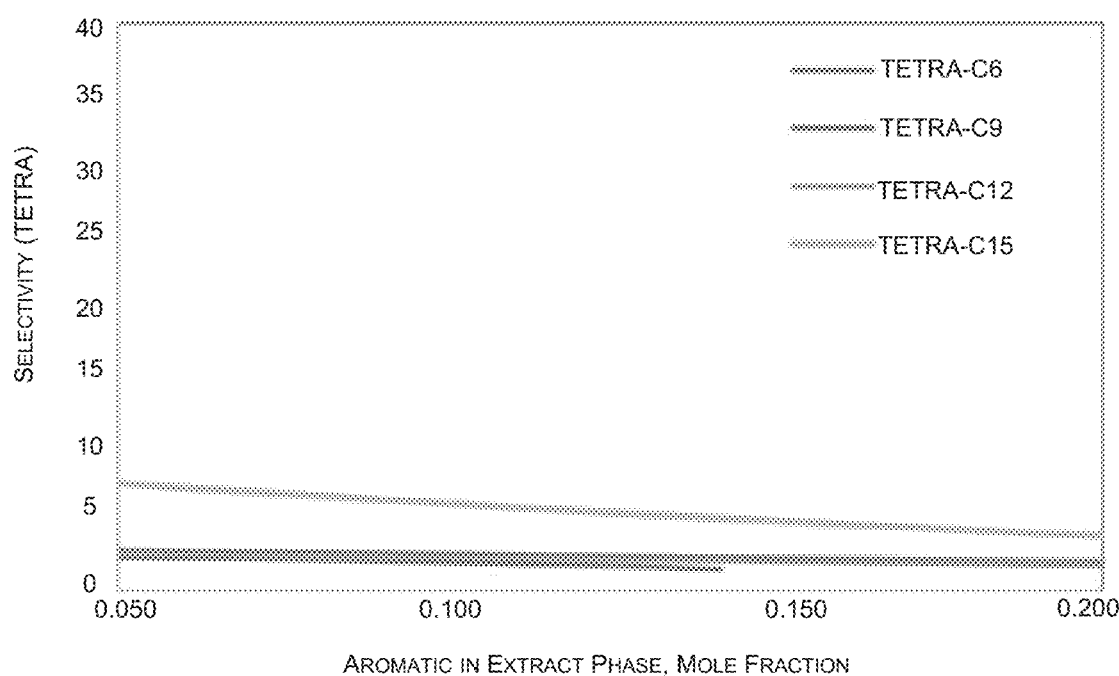
Figure 5E:
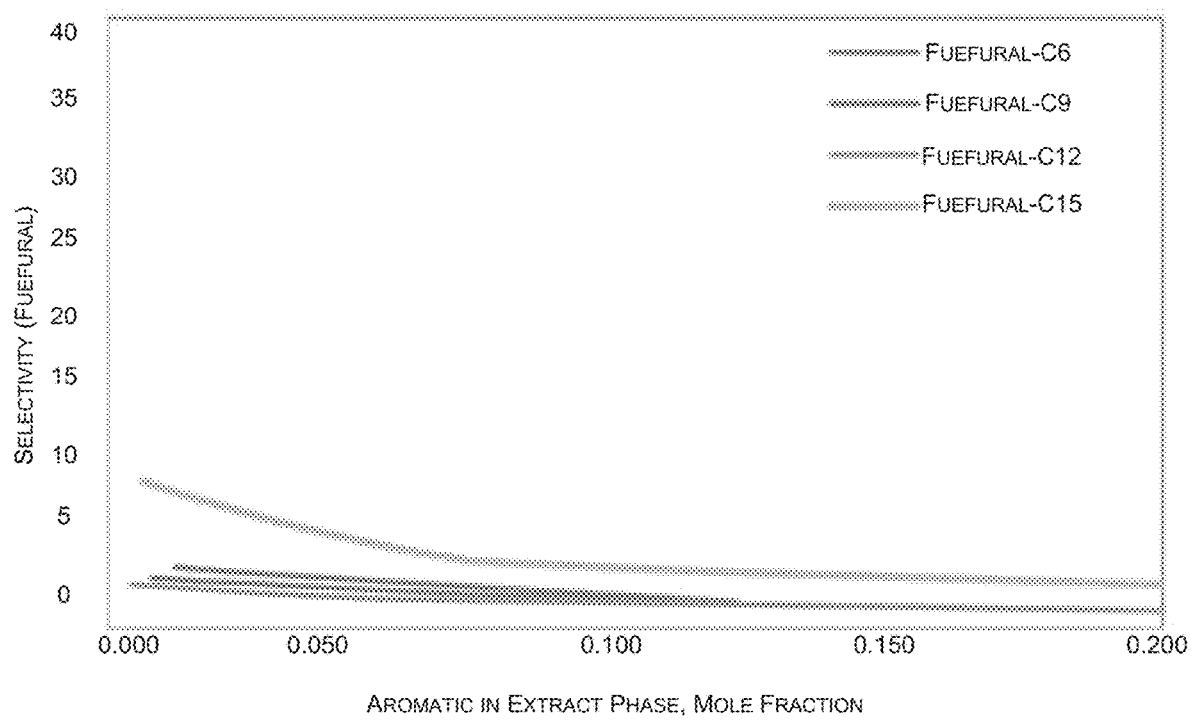
Figure 5F:
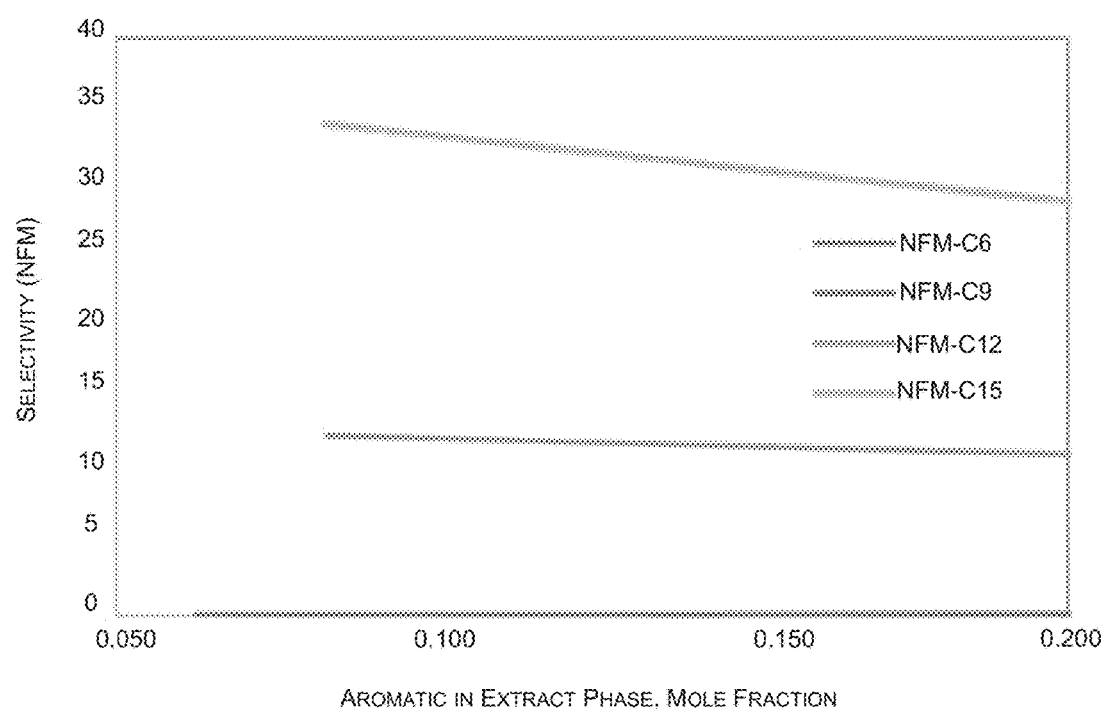
Figure 6A:
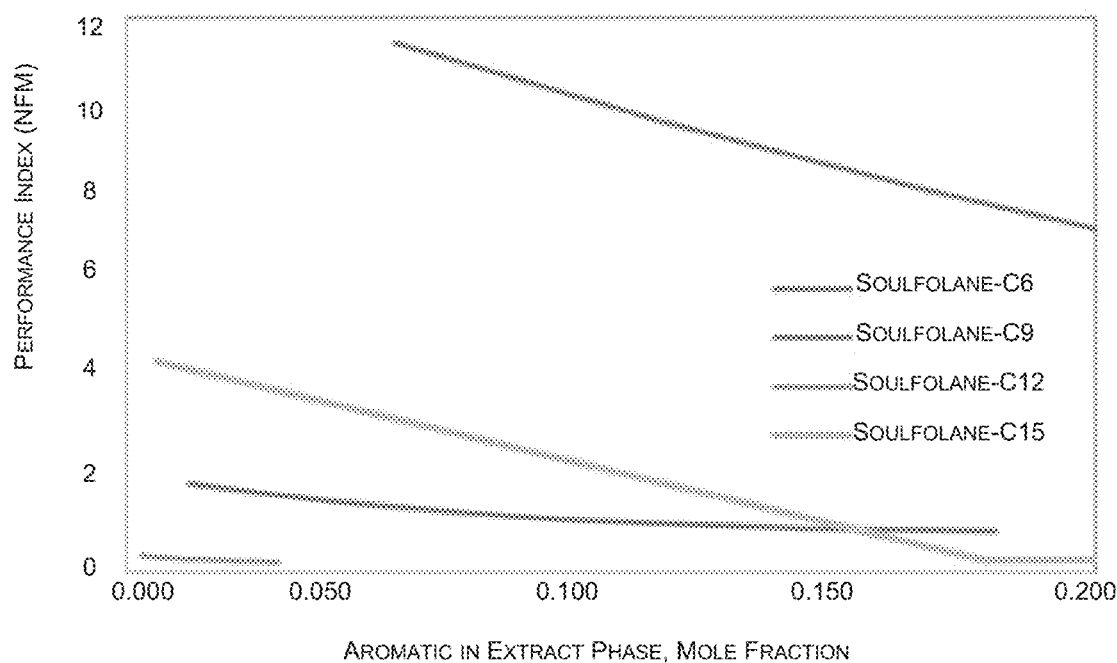
FIGS. 6A-6F illustrate exemplary graphs showing Performance Index of TMS, NMP, TETRA, TRI, Furfural & NFM, in accordance with embodiments of the present disclosure.
Figure 6B:
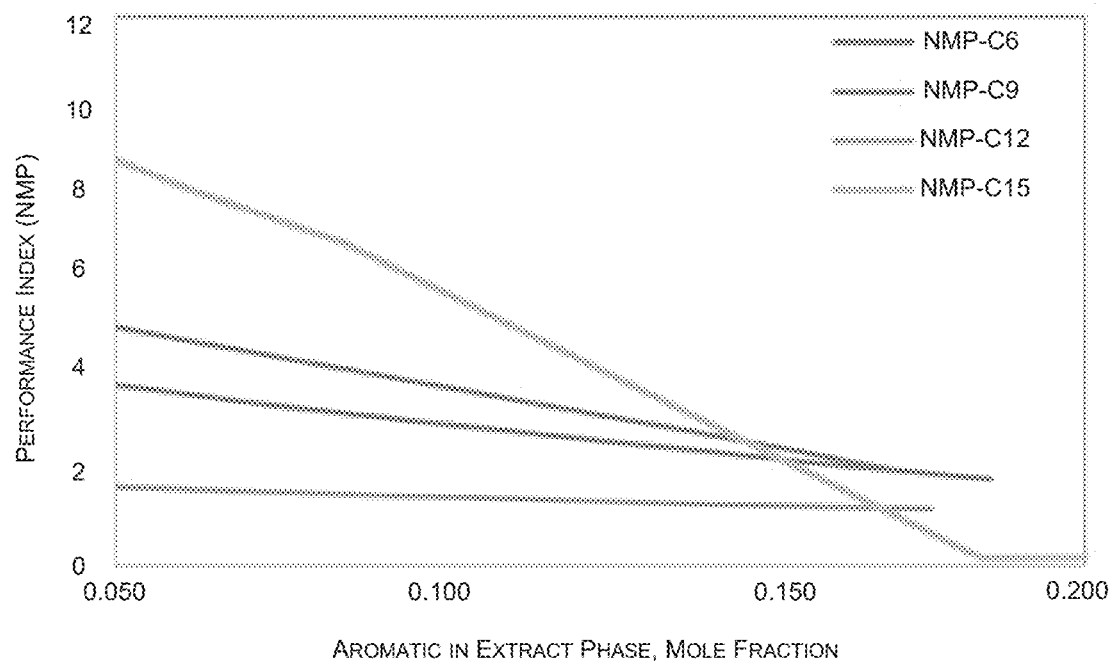
Figure 6C:
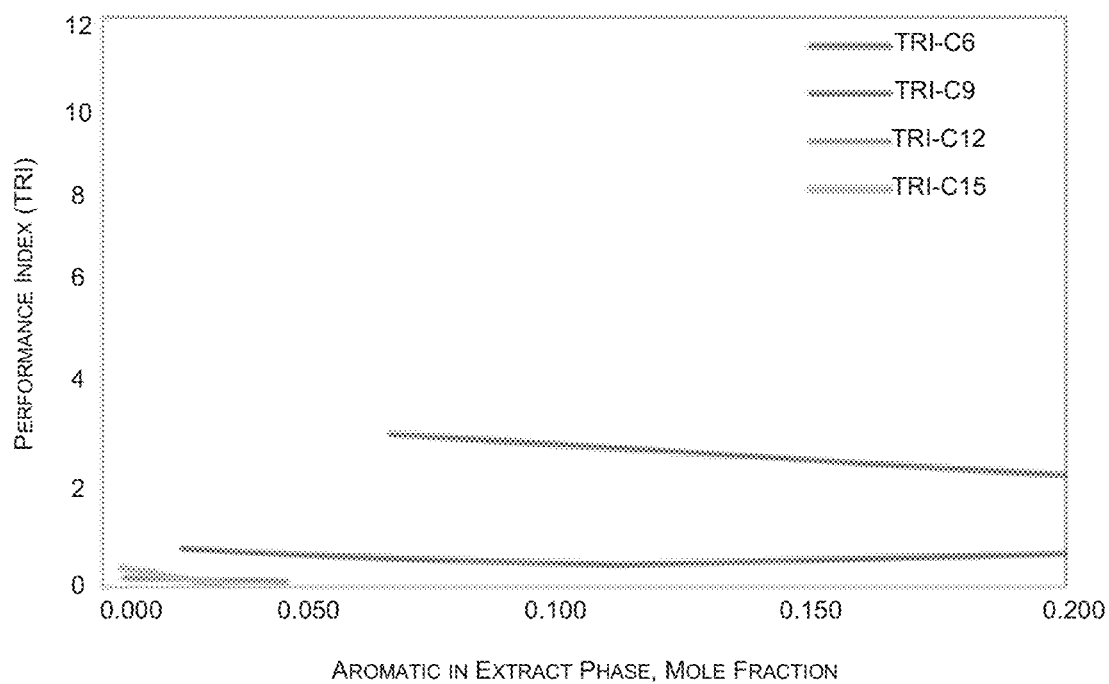
Figure 6D:
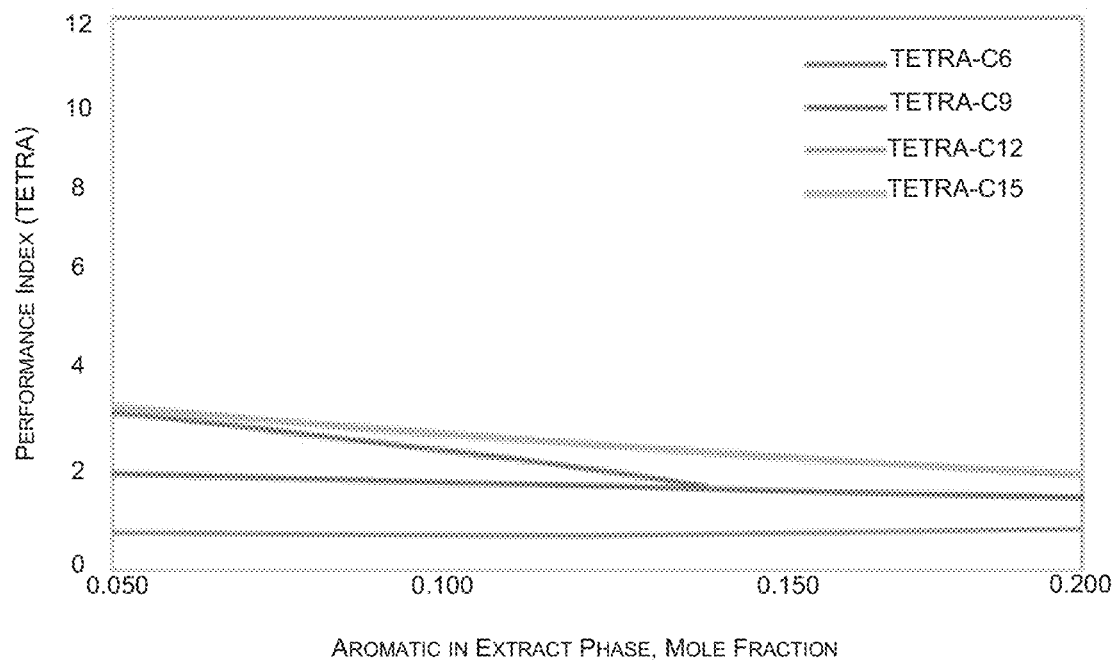
Figure 6E:
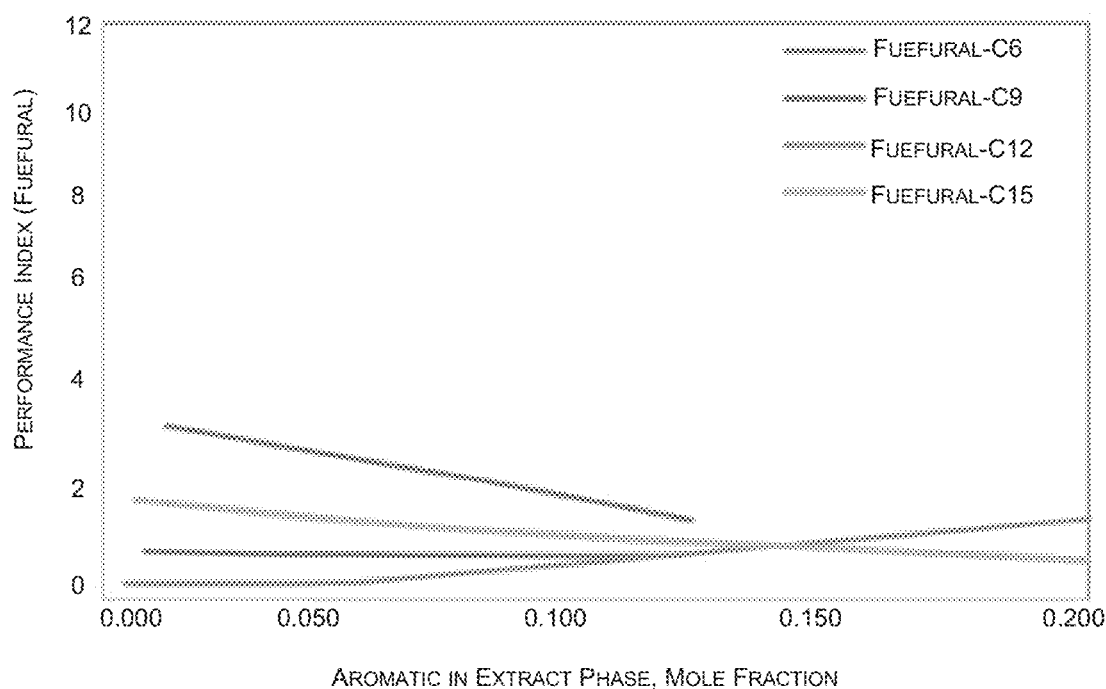
Figure 6F:
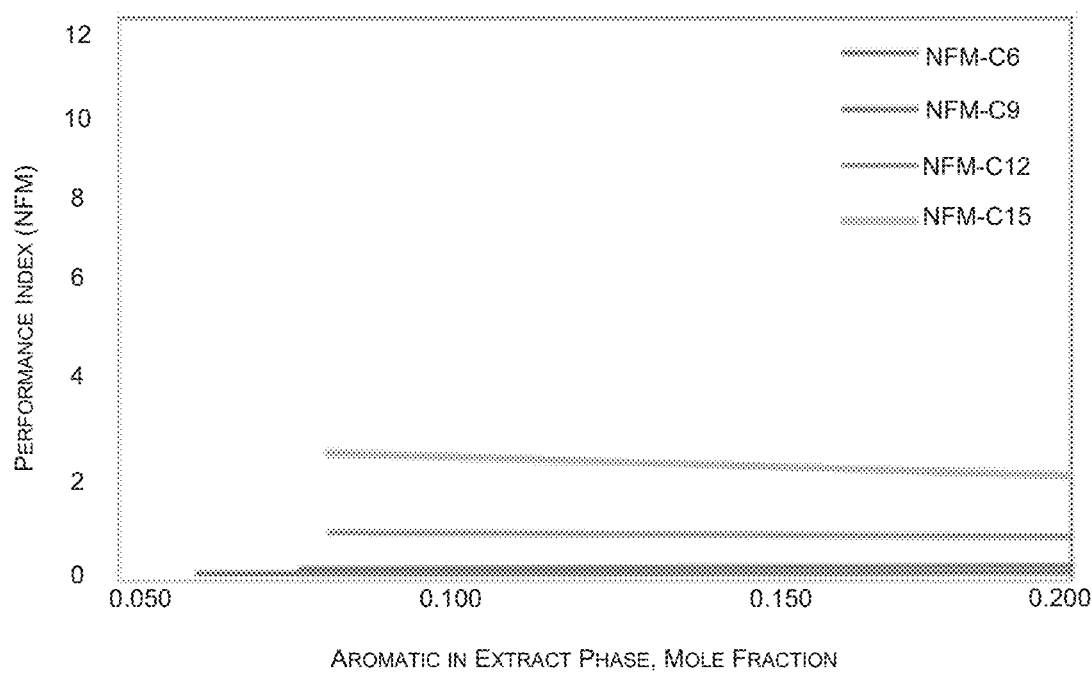

The phase equilibria behaviour of six different potential polar solvents were studied for selection of the most suitable solvent for dearomatization. These solvents include Sulfolane (TMS), N-Methyl Pyrolidinone (NMP), Tetra-ethyleneglycol (TETRA), Tri-ethylene-glycol (TRI), Furfural and N-Formylmorpholine (NFM). The interaction behaviour of components (C6, C9, C12 & C15): Paraffin (Hexane, N-Nonane, N-Dodecane & N-Pentadecane), Aromatics (Benzene, 1-methyl-3-ethylbenzene, 1,2,4-Triethylbenzene & 1-N-Pentylnaphthalene) and solvents were studied by plotting ternary phase diagrams at ambient conditions. Ternary phase diagram for TMS, NMP & TETRA for carbon number C15 components (paraffin, aromatics) are depicted as an illustration in FIG. 3. Based on the phase equilibria data analysis, distribution coefficient, selectivity, and performance index (PI) of the solvents were investigated. The universal quasi-chemical (UNIQUAC) model was used to predict the liquid-liquid equilibria (LLE) for all the hydrocarbon systems in the carbon range (C6 to C15) in Aspen plus.

Ternary phase diagrams clearly reveal that the miscible region, immiscible region, two-phase envelop (equilibrium line), tie-lines and plait point (wherein, three-component mixture separates into two phases). The distribution coefficient is defined as a partition coefficient (C), the ratio of concentrations of a component in the two phases of a mixture of two immiscible liquids at equilibrium.

The distribution coefficient of solvents is defined as $$C = \frac{\text{Mole fraction of solute in extract phase}}{\text{Mole fraction of solute in raffinate phase}}$$

High distribution coefficient requires low solvent to feed ratio and this is one of the desirable parameters for solvent selection. As per ternary phase diagram of TMS reported in FIG. 3, the miscible region is smallest, the estimated distribution coefficient is high and it further increases with increasing solute (aromatics) in extract phase. In the similar manner, distribution coefficients for all other solvents for carbon range (C6 to C15) were estimated, analyzed and plotted in FIG. 4.

The selectivity of solvent is defined as $$S = \frac{(\text{Mole fraction of aromatics in extract phase})/(\text{Mole fraction of paraffin in extract phase})}{(\text{Mole fraction of aromatics in raffinate phase})/(\text{Mole fraction of paraffin raffinate phase})}$$

The selectivity parameters for all the solvents for carbon range (C6 to C15) were calculated and the same is plotted in FIG. 5. The selectivity of TMS solvent for C15 components (paraffins, aromatics) interactions was found poor. It is noteworthy to mention that selectivity is the equilibrium ratio of solute (aromatics) in each phase and if it is observed to be poor, then the quality of raffinate produced using low selectivity solvents will always be inferior.

High distribution coefficient always gives rise to low selectivity and vice versa. Therefore, the performance index (PI), defined as the product of the distribution coefficient and the selectivity, is regarded as a useful measurement of overall extraction efficiency. In this section, performance index parameters were estimated (the same is depicted in FIG. 6) to investigate the capabilities of solvents for dearomatization for different carbon numbers C6, C9, C12 & C15 of the feed. Distribution coefficient of TETRA is found to be better than TMS for C6 feed (FIG. 4). However, the selectivity and performance index of Sulfolane is found best among all the solvents for C6 carbon numbers as feed (FIG. 5 and FIG. 6). Therefore, sulfolane has been widely used in industry as solvent for light naphtha dearomatization. In case of C9 carbon number, the distribution coefficients of NMP and TETRA were observed with similar distribution coefficients (FIG. 4). The selectivity of NFM was highest among all the solvents for C9. However, the overall performance index of NMP was found to be superior among all the solvents even though selectivity of sulfolane and NFM was higher than NMP (FIG. 5 and FIG. 6). Therefore, it can be noted that mix of sulfolane and NMP could be best solvent for the hydrocarbon mixture in the range of C6 to C9. In case of C12, the distribution coefficient of Furfural is found to be highest (FIG. 4). However, the selectivity of sulfolane, NMP and NFM was superior to furfural. In combination of these two parameters, PI for C12 components, NMP was found to be superior as solvent. In case of C15, although NFM has highest distribution coefficients but it has poorest selectivity which turned this solvent as low performer. NMP performance was found to be highest (FIG. 6) among all the solvents even though sulfolane has highest distribution coefficient (FIG. 4) and NFM has highest selectivity (FIG. 5).

Beyond carbon range C9, NMP was found to be the best solvent for dearomatization. It is mainly due to balance behaviour for distribution coefficient and selectivity parameters as compared to other potential solvents which has either distribution coefficient is highest but poorest selectivity and vice versa. It is noteworthy to mention that each solvent performance trends have been different with respect to increasing carbon number (C6→C9→C12→C15). FIG. 6 clearly illustrates that Sulfolane and Furfural have similar PI trend in this carbon number order as C6>C15>C9>C12; NMP & TETRA have similar trend in this carbon number order as C15>C6>C9>C12; TRI trend is C6→C9>C12>C15); and NFM trend is C15>C12>C9>C6 but with poor efficiency. Considering the performance trends and efficiency, it can be clearly seen that with increasing carbon number, performance index is highest for NMP. In addition to the performance, NMP has lowest boiling point among all solvents which is further encouragement for selection because recovering from heavy oils (high boiling materials) will be easier due to wider difference in boiling points. Based on the detailed analysis, NMP was selected for dearomatization of deasphalted oil.

Effect of Type of Solvents

Figure 8A:
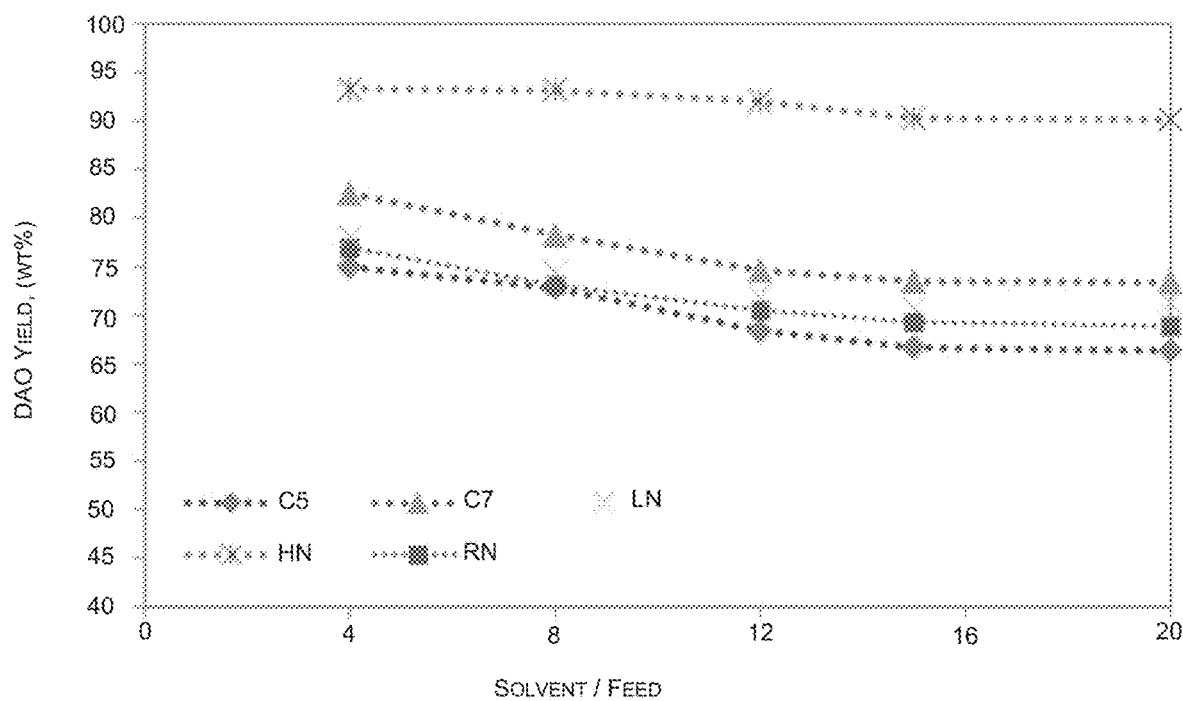
FIGS. 8A-8B illustrate exemplary graphs showing effect of solvent types and solvent to oil ratio on DAO yield and Pitch yield at 25° C., in accordance with embodiments of the present disclosure.
Figure 8B:
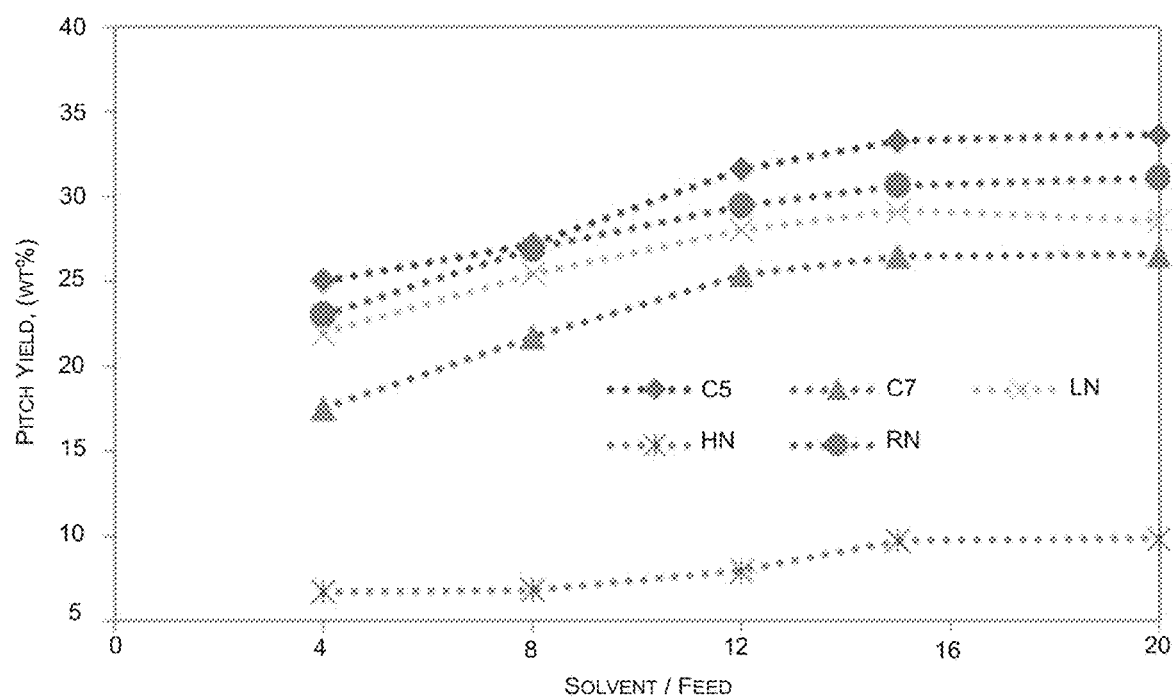
Figure 9A:
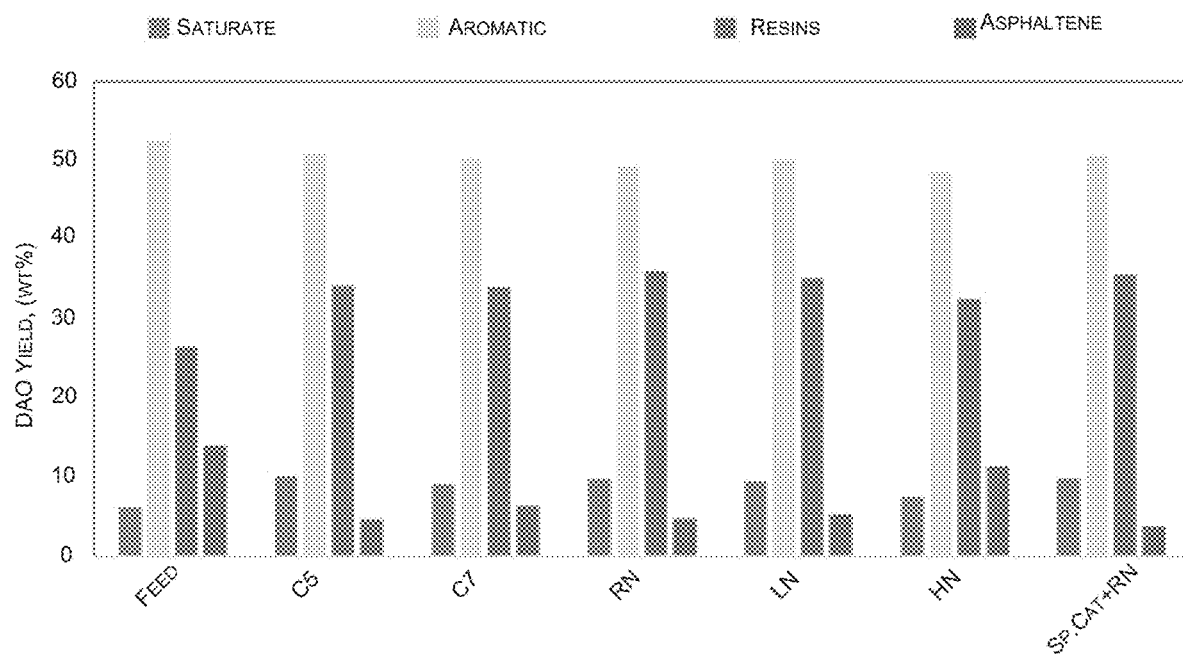
FIGS. 9A-9B illustrate exemplary graphs showing DAO quality at S/F ratio: 20/1; T=25° C. & t=2 hr: with regards saturate, aromatics, resin & asphaltene and % Sulphur in DAO of feed profile, in accordance with embodiments of the present disclosure.
Figure 9B:
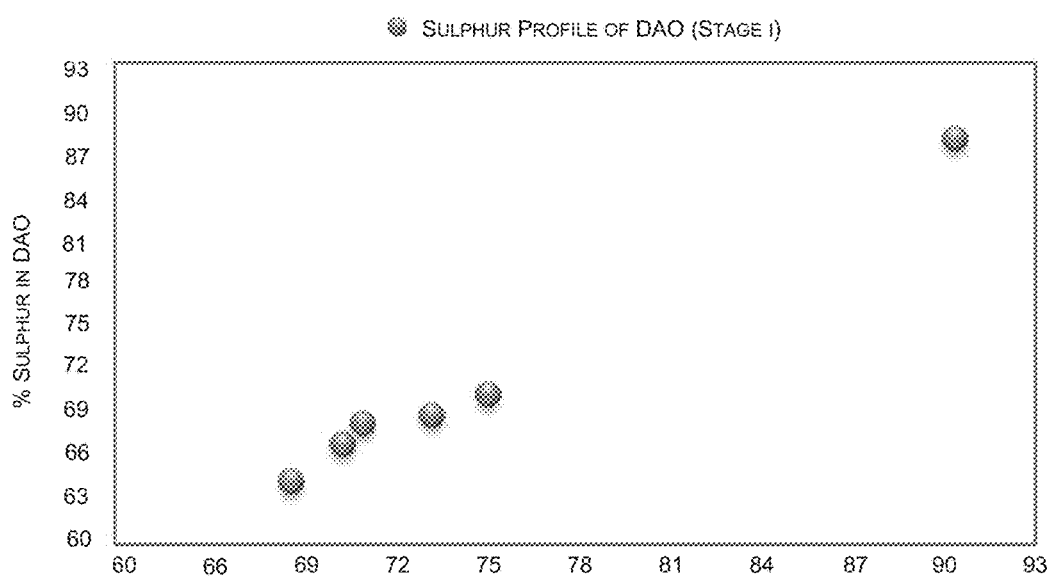

FIG. 8 depicts the DAO and pitch yield profiles of different solvents. FIG. 9 depicts the DAO quality. In deasphalting, yields and quality are directly related, as lowering DAO yields or increasing pitch yields clearly means that it is improving the DAO quality and in a real sense heavy oils are upgraded. High pitch yields also indicate that large quantity of asphaltenes is precipitated and therefore, DAO quality has improved. n-C5 showed highest pitch yield and HN showed lowest pitch yield among all solvents. Among naphtha solvents, RN showed highest pitch yields and therefore, the quality of DAO produced by RN solvent was found to be better as compared to other DAOs obtained with the help of LN and HN. This % reduction in asphaltene content of feed were 63.16%, 54.28%, 65.78%, 62.23% & 18.86% using n-C5, n-C7, raffinate, LN and HN solvents, respectively. This clearly revealed that n-C5 is better solvent than n-C7 and raffinate performance is better as compared to LN & HN for DAO quality.

In addition to this, the DAO yields (66.36 wt %, 73.41 wt %, 68.89 wt %, 71.40 wt %, 90.13 wt %) and the sulphur contents (64.26 wt %, 70.22 wt %, 68.23 wt %, 68.77 wt %, 87.73 wt % of the feed sulphur) in DAO obtained with the help of n-C5, n-C7, RN, LN and HN solvents respectively as reported in FIG. 9. The DAO yields and % sulphur content showed linear relationship, it means that increasing the DAO yields can result in higher amount of sulphur in the DAO. Along with DAO yields & % reduction in asphaltene, the sulphur content of DAO also confirms that n-C5 is better as compared to n-C7, and raffinate was found to be superior among all naphtha solvents, confirming that utilization of untreated naphtha (i.e. straight run naphtha such as light naphtha or heavy naphtha), which upon undergoing dearomatization in the process results in in-situ (or in-line) generation of treated naphtha (e.g. raffinate), would serve its intended purpose.

Effect of S/F Ratio on the DAO Yield and Quality

Figure 10:
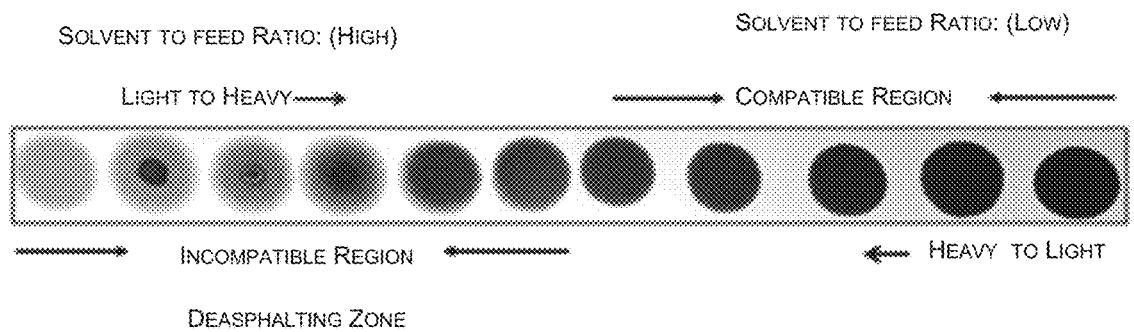
FIG. 10 illustrates an exemplary snippet showing pattern of step-wise blending light into heavy and heavy into light at a 10% increasing rate, in accordance with embodiments of the present disclosure.
Figure 11A:
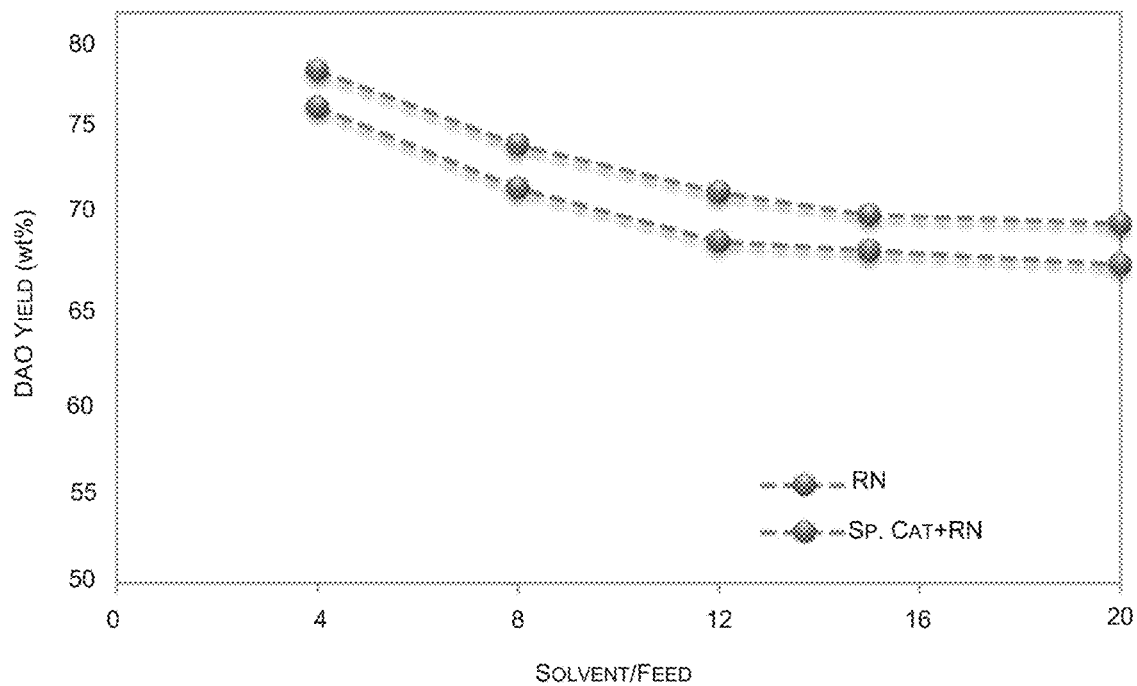
FIGS. 11A-11B illustrate exemplary graphs showing the effect of spent catalyst addition with RN at different solvent to oil ratio on DAO yield and Pitch yield at 25° C., in accordance with embodiments of the present disclosure.
Figure 11B:
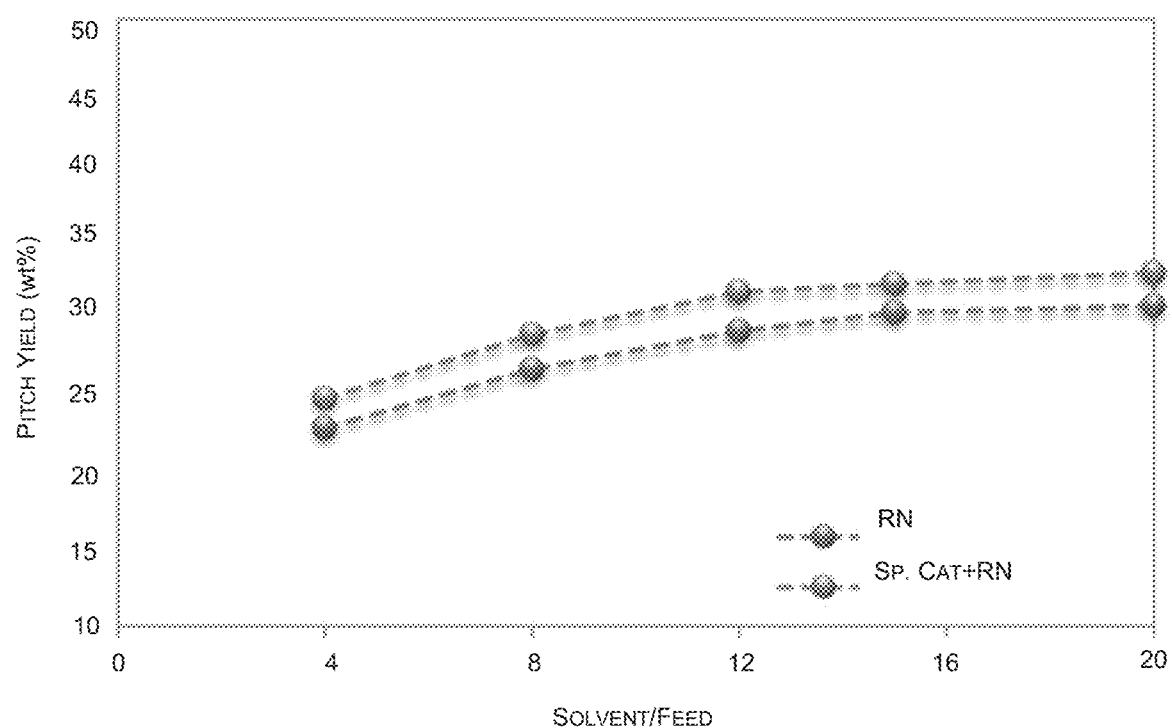

FIG. 8 shows the DAO and pitch yields for n-C5, n-C7, RN, LN and HN solvents respectively. Increasing the S/F reduces the DAO yields and increases the pitch yields however, S/F ratio of 20/1 observed to be optimal at the specified conditions (ambient temperature & pressure) of SDA experiment. The effect of S/F ratio on SDA can be explained through change in solvent power, enhancing resins solubilization which facilitates asphaltene aggregation and precipitation in turn it increases the pitch yields and proportionally lower the DAO yields. To further investigate the effect of S/F ratio on deasphalting, spot test experiments which is one of the visual methods to figure out the asphaltene precipitation pattern (indication of incompatibility/inhomogeneity) were carried out. The interaction of feedstock which is a heavy material with light solvents have been observed and correlated with incompatibility of blending. The pattern of addition of light hydrocarbons with 10% increase in each step into heavy oil, it maintains the compatibility of the blend which is an unfavorable condition for SDA. Conversely, the pattern of addition of heavy oil in light oil with increase of 10% in each step immediately creates incompatibility in the system which is higher S/F ratio case wherein in solvent (light oil) is the continuous phase. The pattern of step-wise blending of light into heavy (low S/F) and heavy into light (high S/F) with incompatibility/compatibility region is the clear demonstration of favorable deasphalting as depicted in FIG. 10. In fact, it is showing that higher S/F ratio increases the extent of incompatibility in the system, disturbs the homogeneity of the oil system for deasphalting. Due to high incompatibility at higher S/F ratio, asphaltene precipitates out in large quantity and thus, increases the pitch yields and proportionally decreases the DAO yields which results in improving DAO quality.

Impact of Spent Catalyst in the Deasphalting Process

Using FCCU spent catalyst material, deasphalting experiments were carried out with raffinate solvent at different S/F ratio (4, 8, 12, 16, 20) and yield profile &quality of DAO observed. FIG. 8 depicted the yield of (a) DAO and (b) pitch as a function of S/F ratio at fixed 5 wt % dosage of spent catalyst. Due to addition of spent catalyst, there is lowering of DAO yield by 2 wt % and pitch yield was proportionally increased after adsorbing asphaltene molecules on the catalyst surface. It is noteworthy to mention that spent catalyst is the zeolite material with Brönsted acid sites and therefore, its selectivity toward asphaltenes on the catalyst surface and its interaction with the asphaltenes and subsequent adsorption was anticipated. However, with increasing S/F ratio, the improvement in pitch yield and lowering in the DAO yield trend was observed to be consistent as shown in FIG. 8. By observing the DAO & pitch yield profile, it is confirmed that the solvent needed for deasphalting can be significantly reduced with the help of spent catalyst adsorbent to obtain similar DAO yields and quality at higher S/F ratio.

To witness the quality improvement in DAO, 7.32 wt % reduction in asphaltene content (initial asphaltene content from 4.79 wt % to 3.76 wt % in DAO) was observed as reported in FIG. 9 ($a$). This improvement in quality is attributed mainly to the interaction between the asphaltenes and the spent catalyst that remain in the pitch fraction. However, small change (from 3.78 wt % to 3.70 wt %) in sulphur content was observed as reported in FIG. 9 ($b$). It was interesting to note the relationship between asphaltene and sulphur constituents association in the heavy oil system. The change in sulfur content was insignificant, this could be due to the fact that —N— and —O— containing asphaltene groups were lead to get adsorbed on the spent catalyst surface over that of sulphur group asphaltenes.

Dearomatization of Deasphalted Oil

Figure 12:
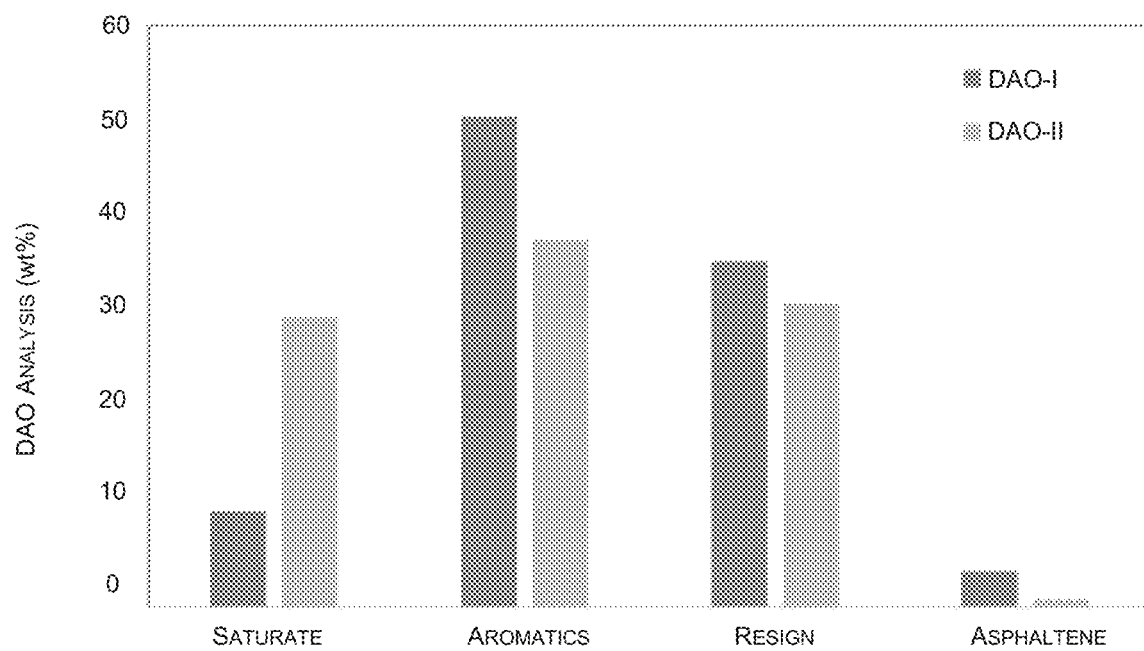
FIG. 12 illustrates an exemplary graph showing quality of DAO-I & DAO-II, in accordance with embodiments of the present disclosure.

The purpose of supplementing the process with dearomatization is to feed high quality diet to cracking units. Otherwise it has to compromise with low value options such as blending with lower quantity, bitumen feedstock or fuel oil blending stock etc. To explore the possibilities, dearomatization experiment using NMP was carried out at temperature near the boiling point of solvent i.e., T=200° C.; S/F ratio=1/1 (w/w); and stirring time t=4 hours and raffinate and extract were separated. The raffinate (dearomatized product) in this case was DAO-II. The dearomatization product DAO-II yield was 77.33 wt %. Due to NMP extraction, the quality of DAO-II was improved for asphaltene content (reduced from 3.76 wt % to 0.8 wt %), aromatics content (reduced from 56.30 wt % to 40.94 wt %) and saturate content (increased from 9.00 wt % to 29.96 wt %). However, there was less impact on resin content (it was marginally changed from 30.94 wt % to 28.31 wt %). The comparison of quality of DAO-I and DAO-II has been depicted in FIG. 12. This means that aromatics components have been selectively removed by NMP and due to this the final product became paraffin-rich and therefore solvent deasphalting dearomatized product DAO-II found to be appropriate for catalytic cracking. It was observed that NMP extraction has improved the DAO-I quality into most suitable feedstock for cracking in secondary refinery units.

Fluid Catalytic Cracking of Deasphalted Dearomatized Oil

Fluid catalytic cracking was carried out with five different feedstock viz. (a) conventional vacuum gas oil (VGO), (b) VGO mixed with neat VR2 (10 wt %) which is a feedstock to SD-A$^2$, (c) VGO mixed with DAO-I (10 wt %) and (d) VGO mixed with DAO-II (10 wt %) respectively at the conditions mentioned hereinabove. To understand the impact at each stage of the process, the FCC product yields were compared and reported in Table 5.

TABLE 5

Fluid Catalytic Cracking of DAOs

| | |
|---|---|
| Catalyst | FCCU spent catalyst |
| Catalyst characteristics | BET SA (196 m2/g); Micro pore volume (0.05 cc/g); Micro porous area (132 m2/g); Matrix surface area (64 m2/g); Unit Cell (24.25 Å) |

TABLE 5-continued

Fluid Catalytic Cracking of DAOs

| FCCU pilot plant conditions | Temperature = 520° C., Injection time = 27 seconds; Cat/Oil ratio = 4/1 | | | |
|---|---|---|---|---|
| Feed Name | VGO | VGO + VR2 (10 wt %) | VGO + DAO-I (10 wt %) | VGO + DAO-II (10 wt %) |
| Conversion, wt % | 65.13 | 67.68 | 71.12 | 71.00 |
| Coke, wt % | 4.44 | 7.31 | 6.79 | 4.18 |
| Dry Gas | 1.38 | 1.52 | 1.77 | 1.22 |
| LPG | 15.37 | 14.82 | 16.28 | 16.15 |
| C3s | 5.69 | 5.56 | 5.74 | 5.80 |
| C4s | 9.69 | 9.27 | 10.54 | 10.35 |
| Gasoline, wt % | 43.93 | 44.03 | 46.28 | 49.45 |
| LCO, wt % | 25.41 | 20.09 | 18.60 | 20.60 |
| HCO, wt % | 3.09 | 2.67 | 2.52 | 2.11 |
| Bottoms (370+), wt % | 6.38 | 9.56 | 7.77 | 6.29 |

Gasoline is a high value and high demand product and therefore it is always targeted to produce in largest quantity. Table 5 data clearly showed that gasoline yield has direct relationship with DAO quality, it increases with improving the DAO quality. In the experimental results, gasoline yields increased by 0.10 wt %, 2.35 wt % & 5.52 wt % by addition of 10 wt % each VR, DAO-I & DAO-II respectively. In is noteworthy to mention that there is increase on 3.17 wt % more gasoline yields on account of supplemented dearomatization step which is significant. This is primarily due to improving the paraffinic composition (high saturates) of DAO-II which is the prime precursor for producing high octane gasoline blend and that could be achieved through combining deasphalting followed by dearomatization. There is no significant change in gasoline yields due to 10 wt % addition of VR, it implies that up to 10 wt % of VR blending, there is no change in paraffinic composition of feedstock. Coke yield has always been the concern for FCCU, and especially when any other heavy material is mixed with conventional VGO feedstock for value maximization. Excess coke yield can imbalance the heat of combined operation of cracker which is endothermic process, and the regenerator which is an exothermic process. It also affects the catalyst activity and product selectivity (by blocking the active sites) and therefore, undesired product yields such as bottom and dry gas will be higher. Neat heavy oils (e.g., VR) contains high Asphaltene and high CCR content which particularly indicates high aromatics compounds in the feed and both the properties are coke precursors. Therefore combining deasphalting and dearomatization can improve both the aspects and produce suitable feedstock for cracking.

The coke yield has drastically increased by 2.87 wt % when 10 wt % neat VR was mixed with VGO; when 10 wt % DAO-I (deasphalted oil) mixed with VGO, still there is 2.35 wt % increase in coke yield. Mixing of 10 wt % deasphalted dearomatized oil (DAO-II) with VGO resulted in decrease of 0.26 wt % coke yield which is an encouragement to invite such diet to keep catalyst, process, equipment & environment along with economics in a healthy conditions. The coke yields trends also reflected on dry gas yields. It is higher for VGO+10% VR & VGO+DAO-I, however it is lower for VGO+DAO-II. Dry gas yields also contains H2S which is generally due to sulphur compounds embedded in large structure of asphaltene and it come out during thermal cracking. Therefore, lower asphaltenic feed VGO+DAO-II produced 0.30 wt % lower dry gas than VGO+VR2. LPG (C3+C4) is also a high value product generally used as either domestic cooking or for production of oxygenates as octane improvers. The impact of solvent deasphalting (VGO+DAO-I) on LPG yield is noted to be about 0.91 wt % as compared to neat VGO, however, further dearomatization of feedstock (VGO+DAO-II) has insignificant impact (−0.13 wt %) on LPG yield at the specified FCCU operating conditions. It is also important to note that without SD-A$^2$ (i.e., with VGO+VR feed), there is decrease in LPG yields by 0.55 wt %. Therefore, treatment of feedstock is necessary for increasing the valuable product yields. The undesirable products such as LCO & HCO have proportionally decreased with solvent deasphalting dearomatization of feedstock.

While the foregoing description discloses various embodiments of the disclosure, other and further embodiments of the invention may be devised without departing from the basic scope of the disclosure. The invention is not limited to the described embodiments, versions or examples, which are included to enable a person having ordinary skill in the art to make and use the invention when combined with information and knowledge available to the person having ordinary skill in the art.

ADVANTAGES

The present disclosure provides an improved process for heavy oil upgradation that is not dependent on utilization of conventional costly solvents such as propane, butane, pentane, hexane, heptane and treated naphtha.

The present disclosure provides an improved process for heavy oil upgradation that is significantly economical and which can take up incompatible heavy oil streams as feed.

We claim:

1. A process for solvent deasphalting dearomatization for heavy oil upgradation, said process comprising:
    (a) effecting deasphaltenation of a heavy oil feed by contacting the feed with a paraffinic rich solvent in presence of a Fluid Catalytic Cracking (FCC) catalyst to obtain a deasphalted oil (DAO) rich stream, said paraffinic rich solvent being untreated naphtha;
    (b) contacting the deasphalted oil (DAO) rich stream with a second solvent to obtain a raffinate stream rich in non-asphaltene and non-aromatic contents and a solvent rich stream;
    (c) contacting the raffinate stream with water in a first decanter to obtain a first stream rich in aromatic-lean fraction and a second stream rich in the second solvent and water;
    (d) subjecting the first stream to distillation to recover the paraffinic rich solvent and to obtain deasphalted oil;
    (e) contacting the solvent rich stream with water in a second decanter to obtain an aromatic rich fraction and a third stream rich in the second solvent and water; and
    (f) subjecting the second stream and the third stream to distillation to recover the second solvent and water.

2. The process as claimed in claim 1, wherein said second solvent is selected from N-methyl-2-pyrrolidone (NMP), water and combinations thereof, and wherein the deasphalted oil (DAO) rich stream is contacted with the second solvent in a weight ratio ranging from 4:1 to 1:4.

3. The process as claimed in claim 1, wherein the weight ratio of the solvent to the feed (S:F) is between 1:1 to 30:1.

4. The process as claimed in claim 1, wherein said Fluid Catalytic Cracking (FCC) catalyst is a spent FCC catalyst, said spent FCC catalyst having BET surface area ranging from 100 m$^2$/g to 200 m$^2$/g, micro pore volume ranging from 0.02 cc/g to 0.08 cc/g, microporous area ranging from 60 m²/g to 180 m²/g, and matrix surface area ranging from 40 m²/g to 80 m²/g.

5. The process as claimed in claim 1, wherein the step of deasphaltenation of a heavy oil feed is effected in presence of the Fluid Catalytic Cracking (FCC) catalyst at an amount ranging from 0.5 wt. % to about 15 wt. %.

6. The process as claimed in claim 1, wherein the recovered paraffinic rich solvent is reused for effecting deasphaltenation of heavy oil feed, and wherein the recovered second solvent is reused for effecting dearomatization of deasphalted oil rich stream.

7. The process as claimed in claim 1, wherein the step of deasphaltenation is effected by contacting the feed with untreated naphtha in presence of the spent Fluid Catalytic Cracking (FCC) catalyst to obtain the deasphalted oil (DAO) rich stream, and wherein the weight ratio of the solvent to the feed (S:F) is 20:1 and the amount of spent Fluid Catalytic Cracking (FCC) catalyst is 5 wt. %.

8. A process for solvent deasphalting dearomatization for heavy oil upgradation, said process comprising:
(a) effecting deasphaltenation of a heavy oil feed by contacting the feed with a paraffinic rich solvent to obtain a deasphalted oil (DAO) rich stream, said paraffinic rich solvent being untreated naphtha;
(b) contacting the deasphalted oil (DAO) rich stream with a second solvent to obtain a raffinate stream rich in non-asphaltene and non-aromatic contents and a solvent rich stream;
(c) contacting the raffinate stream with water in a first decanter to obtain a first stream rich in aromatic-lean fraction and a second stream rich in the second solvent and water;
(d) subjecting the first stream to distillation to recover the paraffinic rich solvent and to obtain deasphalted oil;
(e) contacting the solvent rich stream with water in a second decanter to obtain an aromatic rich fraction and a third stream rich in the second solvent and water; and
(f) subjecting the second stream and the third stream to distillation to recover the second solvent and water.

9. The process as claimed in claim 8, wherein the weight ratio of the solvent to the feed (S:F) is between 1:1 to 30:1.

10. The process as claimed in claim 8, wherein the deasphalted oil (DAO) rich stream is contacted with the second solvent in a weight ratio ranging from 4:1 to 1:4, said second solvent being selected from N-methyl-2-pyrrolidone (NMP), water and combinations thereof.

\* \* \* \* \*